(12) United States Patent
Bloch et al.

(10) Patent No.: US 12,284,425 B2
(45) Date of Patent: *Apr. 22, 2025

(54) AUTOMATED PLATFORM FOR GENERATING INTERACTIVE VIDEOS

(71) Applicant: JBF Interlude 2009 LTD, Tel Aviv (IL)

(72) Inventors: Jonathan Bloch, Ramat HaSharon (IL); Tal Zubalsky, Brooklyn, NY (US); Yuval Hofshy, Kfar Saba (IL); Alon Benari, Brooklyn, NY (US)

(73) Assignee: JBF Interlude 2009 LTD, Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/528,925

(22) Filed: Dec. 5, 2023

(65) Prior Publication Data

US 2024/0107120 A1    Mar. 28, 2024

Related U.S. Application Data

(63) Continuation of application No. 17/334,027, filed on May 28, 2021, now Pat. No. 11,882,337.

(51) Int. Cl.
*H04N 21/478* (2011.01)
*H04N 21/44* (2011.01)
(Continued)

(52) U.S. Cl.
CPC . *H04N 21/47815* (2013.01); *H04N 21/44008* (2013.01); *H04N 21/4431* (2013.01); *H04N 21/8545* (2013.01); *H04N 21/8586* (2013.01)

(58) Field of Classification Search
CPC ....... H04N 21/47815; H04N 21/44008; H04N 21/4431; H04N 21/8545; H04N 21/8586
(Continued)

(56) References Cited

U.S. PATENT DOCUMENTS

| 4,569,026 A | 2/1986 | Best |
| 5,137,277 A | 8/1992 | Kitaue |

(Continued)

FOREIGN PATENT DOCUMENTS

| CA | 2639491 A1 | 3/2010 |
| DE | 004038801 A1 | 6/1992 |

(Continued)

OTHER PUBLICATIONS

U.S. Appl. No. 12/706,721 U.S. Pat. No. 9,190,110 Published as US2010/0293455, System and Method for Assembling a Recorded Composition, filed Feb. 17, 2010.

(Continued)

*Primary Examiner* — Adil Ocak
(74) *Attorney, Agent, or Firm* — Goodwin Procter LLP

(57) ABSTRACT

Systems and methods generating interactive videos on an automated platform are provided herein. The example methods can include receiving data associated with at least one physical item and receiving video content comprising a visual presentation of the physical item. The method can include receiving a selection of a predetermined template, in which the template comprising a plurality of modules organized in a tree structure. The method can further include organizing the video content into the predetermined template to form organized video content, and embedding an object in a portion of the organized video content to form an interactive video, in which the object is based on the received data and is configured to enable at least one of: (i) user interaction with the physical item; or (ii) a link to a webpage associated with the physical item.

28 Claims, 15 Drawing Sheets

(51) Int. Cl.
*H04N 21/443* (2011.01)
*H04N 21/8545* (2011.01)
*H04N 21/858* (2011.01)

(58) Field of Classification Search
USPC .......................................................... 725/60
See application file for complete search history.

(56) References Cited

U.S. PATENT DOCUMENTS

| | | |
|---|---|---|
| 5,161,034 A | 11/1992 | Klappert |
| 5,568,602 A | 10/1996 | Callahan et al. |
| 5,568,603 A | 10/1996 | Chen et al. |
| 5,597,312 A | 1/1997 | Bloom et al. |
| 5,607,356 A | 3/1997 | Schwartz |
| 5,610,653 A | 3/1997 | Abecassis |
| 5,636,036 A | 6/1997 | Ashbey |
| 5,676,551 A | 10/1997 | Knight et al. |
| 5,694,163 A | 12/1997 | Harrison |
| 5,715,169 A | 2/1998 | Noguchi |
| 5,734,862 A | 3/1998 | Kulas |
| 5,737,527 A | 4/1998 | Shiels et al. |
| 5,745,738 A | 4/1998 | Ricard |
| 5,751,953 A | 5/1998 | Shiels et al. |
| 5,754,770 A | 5/1998 | Shiels et al. |
| 5,818,435 A | 10/1998 | Kozuka et al. |
| 5,848,934 A | 12/1998 | Shiels et al. |
| 5,887,110 A | 3/1999 | Sakamoto et al. |
| 5,894,320 A | 4/1999 | Vancelette |
| 5,956,037 A | 9/1999 | Osawa et al. |
| 5,966,121 A | 10/1999 | Hubbell et al. |
| 5,983,190 A | 11/1999 | Trower, II et al. |
| 6,067,400 A | 5/2000 | Saeki et al. |
| 6,091,886 A | 7/2000 | Abecassis |
| 6,122,668 A | 9/2000 | Teng et al. |
| 6,128,712 A | 10/2000 | Hunt et al. |
| 6,160,952 A | 12/2000 | Mimura et al. |
| 6,191,780 B1 | 2/2001 | Martin et al. |
| 6,222,925 B1 | 4/2001 | Shiels et al. |
| 6,240,555 B1 | 5/2001 | Shoff et al. |
| 6,298,020 B1 | 10/2001 | Kumagami |
| 6,298,482 B1 | 10/2001 | Seidman et al. |
| 6,460,036 B1 | 10/2002 | Herz |
| 6,535,639 B1 | 3/2003 | Uchihachi et al. |
| 6,657,906 B2 | 12/2003 | Martin |
| 6,698,020 B1 | 2/2004 | Zigmond et al. |
| 6,728,477 B1 | 4/2004 | Watkins |
| 6,771,875 B1 | 8/2004 | Kunieda et al. |
| 6,801,947 B1 | 10/2004 | Li |
| 6,947,966 B1 | 9/2005 | Oko, Jr. et al. |
| 7,085,844 B2 | 8/2006 | Thompson |
| 7,155,676 B2 | 12/2006 | Land et al. |
| 7,231,132 B1 | 6/2007 | Davenport |
| 7,296,231 B2 | 11/2007 | Loui et al. |
| 7,310,784 B1 | 12/2007 | Gottlieb et al. |
| 7,319,780 B2 | 1/2008 | Fedorovskaya et al. |
| 7,379,653 B2 | 5/2008 | Yap et al. |
| 7,430,360 B2 | 9/2008 | Abecassis |
| 7,444,069 B1 | 10/2008 | Bernsley |
| 7,472,910 B1 | 1/2009 | Okada et al. |
| 7,627,605 B1 | 12/2009 | Lamere et al. |
| 7,650,623 B2 | 1/2010 | Hudgeons et al. |
| 7,669,128 B2 | 2/2010 | Bailey et al. |
| 7,694,320 B1 | 4/2010 | Yeo et al. |
| 7,779,438 B2 | 8/2010 | Davies |
| 7,787,973 B2 | 8/2010 | Lambert |
| 7,917,505 B2 | 3/2011 | van Gent et al. |
| 8,024,762 B2 | 9/2011 | Britt |
| 8,046,801 B2 | 10/2011 | Ellis et al. |
| 8,065,710 B2 | 11/2011 | Malik |
| 8,151,139 B1 | 4/2012 | Gordon |
| 8,156,004 B2 | 4/2012 | Wajihuddin |
| 8,176,425 B2 | 5/2012 | Wallace et al. |
| 8,190,001 B2 | 5/2012 | Bernsley |
| 8,202,167 B2 | 6/2012 | Ackley et al. |
| 8,276,058 B2 | 9/2012 | Gottlieb et al. |
| 8,281,355 B1 | 10/2012 | Weaver et al. |
| 8,321,905 B1 | 11/2012 | Streeter et al. |
| 8,341,662 B1 | 12/2012 | Bassett et al. |
| 8,350,908 B2 | 1/2013 | Morris et al. |
| 8,405,706 B2 | 3/2013 | Zhang et al. |
| 8,600,220 B2 | 12/2013 | Bloch et al. |
| 8,612,517 B1 | 12/2013 | Yadid et al. |
| 8,626,337 B2 | 1/2014 | Corak et al. |
| 8,646,020 B2 | 2/2014 | Reisman |
| 8,650,489 B1 | 2/2014 | Baum et al. |
| 8,667,395 B2 | 3/2014 | Hosogai et al. |
| 8,750,682 B1 | 6/2014 | Nicksay et al. |
| 8,752,087 B2 | 6/2014 | Begeja et al. |
| 8,826,337 B2 | 9/2014 | Issa et al. |
| 8,860,882 B2 | 10/2014 | Bloch et al. |
| 8,930,975 B2 | 1/2015 | Woods et al. |
| 8,977,113 B1 | 3/2015 | Rumteen et al. |
| 9,009,619 B2 | 4/2015 | Bloch et al. |
| 9,021,537 B2 | 4/2015 | Funge et al. |
| 9,082,092 B1 | 7/2015 | Henry |
| 9,094,718 B2 | 7/2015 | Barton et al. |
| 9,190,110 B2 | 11/2015 | Bloch |
| 9,257,148 B2 | 2/2016 | Bloch et al. |
| 9,268,774 B2 | 2/2016 | Kim et al. |
| 9,271,015 B2 | 2/2016 | Bloch et al. |
| 9,313,536 B1 | 4/2016 | Killick |
| 9,363,464 B2 | 6/2016 | Alexander |
| 9,367,196 B1 | 6/2016 | Goldstein et al. |
| 9,374,411 B1 | 6/2016 | Goetz |
| 9,380,326 B1 | 6/2016 | Corley et al. |
| 9,390,099 B1 | 7/2016 | Wang et al. |
| 9,456,247 B1 | 9/2016 | Pontual et al. |
| 9,465,435 B1 | 10/2016 | Zhang et al. |
| 9,473,582 B1 | 10/2016 | Fraccaroli |
| 9,497,496 B1 | 11/2016 | Corley et al. |
| 9,510,044 B1 | 11/2016 | Pereira et al. |
| 9,520,155 B2 | 12/2016 | Bloch et al. |
| 9,530,454 B2 | 12/2016 | Bloch et al. |
| 9,531,998 B1 | 12/2016 | Farrell et al. |
| 9,538,219 B2 | 1/2017 | Sakata et al. |
| 9,554,061 B1 | 1/2017 | Proctor, Jr. et al. |
| 9,571,877 B2 | 2/2017 | Lee et al. |
| 9,607,655 B2 | 3/2017 | Bloch et al. |
| 9,641,898 B2 | 5/2017 | Bloch et al. |
| 9,653,115 B2 | 5/2017 | Bloch et al. |
| 9,653,116 B2 | 5/2017 | Paulraj et al. |
| 9,672,868 B2 | 6/2017 | Bloch et al. |
| 9,715,901 B1 | 7/2017 | Singh et al. |
| 9,736,503 B1 | 8/2017 | Bakshi et al. |
| 9,792,026 B2 | 10/2017 | Bloch et al. |
| 9,792,957 B2 | 10/2017 | Bloch et al. |
| 9,826,285 B1 | 11/2017 | Mishra et al. |
| 9,967,621 B2 | 5/2018 | Armstrong et al. |
| 10,070,192 B2 | 9/2018 | Baratz |
| 10,178,304 B1 | 1/2019 | Tudor et al. |
| 10,178,421 B2 | 1/2019 | Thomas et al. |
| 10,187,687 B2 | 1/2019 | Harb et al. |
| 10,194,189 B1 | 1/2019 | Goetz et al. |
| 10,257,572 B2 | 4/2019 | Manus et al. |
| 10,257,578 B1 | 4/2019 | Bloch et al. |
| 10,310,697 B2 | 6/2019 | Roberts et al. |
| 10,419,790 B2 | 9/2019 | Gersten |
| 10,460,765 B2 | 10/2019 | Bloch et al. |
| 10,523,982 B2 | 12/2019 | Oyman |
| 10,771,824 B1 | 9/2020 | Haritaoglu et al. |
| 10,856,049 B2 | 12/2020 | Bloch et al. |
| 11,003,748 B2 | 5/2021 | Oliker et al. |
| 2001/0056427 A1 | 12/2001 | Yoon et al. |
| 2002/0019799 A1 | 2/2002 | Ginsberg et al. |
| 2002/0029218 A1 | 3/2002 | Bentley et al. |
| 2002/0052891 A1 | 5/2002 | Michaud et al. |
| 2002/0053089 A1 | 5/2002 | Massey |
| 2002/0086724 A1 | 7/2002 | Miyaki et al. |
| 2002/0089523 A1 | 7/2002 | Hodgkinson |
| 2002/0091455 A1 | 7/2002 | Williams |
| 2002/0105535 A1 | 8/2002 | Wallace et al. |
| 2002/0106191 A1 | 8/2002 | Betz et al. |
| 2002/0120456 A1 | 8/2002 | Berg et al. |
| 2002/0120931 A1 | 8/2002 | Huber et al. |

(56) References Cited

U.S. PATENT DOCUMENTS

| | | |
|---|---|---|
| 2002/0124250 A1 | 9/2002 | Proehl et al. |
| 2002/0129374 A1 | 9/2002 | Freeman et al. |
| 2002/0140719 A1 | 10/2002 | Amir et al. |
| 2002/0144262 A1 | 10/2002 | Plotnick et al. |
| 2002/0174430 A1 | 11/2002 | Ellis et al. |
| 2002/0177914 A1 | 11/2002 | Chase |
| 2002/0194595 A1 | 12/2002 | Miller et al. |
| 2003/0007560 A1 | 1/2003 | Mayhew et al. |
| 2003/0012409 A1 | 1/2003 | Overton et al. |
| 2003/0020744 A1 | 1/2003 | Ellis et al. |
| 2003/0023757 A1 | 1/2003 | Ishioka et al. |
| 2003/0039471 A1 | 2/2003 | Hashimoto |
| 2003/0069057 A1 | 4/2003 | Defrees-Parrott |
| 2003/0076347 A1 | 4/2003 | Barrett et al. |
| 2003/0101164 A1 | 5/2003 | Pic et al. |
| 2003/0148806 A1 | 8/2003 | Weiss |
| 2003/0159566 A1 | 8/2003 | Sater et al. |
| 2003/0183064 A1 | 10/2003 | Eugene et al. |
| 2003/0184598 A1 | 10/2003 | Graham |
| 2003/0221541 A1 | 12/2003 | Platt |
| 2004/0009813 A1 | 1/2004 | Wind |
| 2004/0019905 A1 | 1/2004 | Fellenstein et al. |
| 2004/0034711 A1 | 2/2004 | Hughes |
| 2004/0070595 A1 | 4/2004 | Atlas et al. |
| 2004/0091848 A1 | 5/2004 | Nemitz |
| 2004/0125124 A1 | 7/2004 | Kim et al. |
| 2004/0128317 A1 | 7/2004 | Sull et al. |
| 2004/0138948 A1 | 7/2004 | Loomis |
| 2004/0146275 A1 | 7/2004 | Takata et al. |
| 2004/0172476 A1 | 9/2004 | Chapweske |
| 2004/0194128 A1 | 9/2004 | McIntyre et al. |
| 2004/0194131 A1 | 9/2004 | Ellis et al. |
| 2004/0199923 A1 | 10/2004 | Russek |
| 2004/0261127 A1 | 12/2004 | Freeman et al. |
| 2005/0019015 A1 | 1/2005 | Ackley et al. |
| 2005/0028193 A1 | 2/2005 | Candelore et al. |
| 2005/0055377 A1 | 3/2005 | Dorey et al. |
| 2005/0091597 A1 | 4/2005 | Ackley |
| 2005/0102707 A1 | 5/2005 | Schnitman |
| 2005/0105888 A1 | 5/2005 | Hamada et al. |
| 2005/0107159 A1 | 5/2005 | Sato |
| 2005/0120389 A1 | 6/2005 | Boss et al. |
| 2005/0132401 A1 | 6/2005 | Boccon-Gibod et al. |
| 2005/0166224 A1 | 7/2005 | Ficco |
| 2005/0198661 A1 | 9/2005 | Collins et al. |
| 2005/0210145 A1 | 9/2005 | Kim et al. |
| 2005/0240955 A1 | 10/2005 | Hudson |
| 2005/0251820 A1 | 11/2005 | Stefanik et al. |
| 2005/0251827 A1 | 11/2005 | Ellis et al. |
| 2005/0267948 A1 | 12/2005 | McKinley et al. |
| 2005/0289582 A1 | 12/2005 | Tavares et al. |
| 2006/0002895 A1 | 1/2006 | McDonnell et al. |
| 2006/0024034 A1 | 2/2006 | Filo et al. |
| 2006/0028951 A1 | 2/2006 | Tozun et al. |
| 2006/0064733 A1 | 3/2006 | Norton et al. |
| 2006/0080167 A1 | 4/2006 | Chen et al. |
| 2006/0089843 A1 | 4/2006 | Flather |
| 2006/0120624 A1 | 6/2006 | Jojic et al. |
| 2006/0130121 A1 | 6/2006 | Candelore et al. |
| 2006/0150072 A1 | 7/2006 | Salvucci |
| 2006/0150216 A1 | 7/2006 | Herz et al. |
| 2006/0153537 A1 | 7/2006 | Kaneko et al. |
| 2006/0155400 A1 | 7/2006 | Loomis |
| 2006/0161954 A1 | 7/2006 | Hamada et al. |
| 2006/0200842 A1 | 9/2006 | Chapman et al. |
| 2006/0212904 A1 | 9/2006 | Klarfeld et al. |
| 2006/0222322 A1 | 10/2006 | Levitan |
| 2006/0224260 A1 | 10/2006 | Hicken et al. |
| 2006/0253330 A1 | 11/2006 | Maggio et al. |
| 2006/0274828 A1 | 12/2006 | Siemens et al. |
| 2007/0003149 A1 | 1/2007 | Nagumo et al. |
| 2007/0018980 A1 | 1/2007 | Berteig et al. |
| 2007/0024706 A1 | 2/2007 | Brannon et al. |
| 2007/0028272 A1 | 2/2007 | Lockton |
| 2007/0033633 A1 | 2/2007 | Andrews et al. |
| 2007/0055989 A1 | 3/2007 | Shanks et al. |
| 2007/0079325 A1 | 4/2007 | de Heer |
| 2007/0085759 A1 | 4/2007 | Lee et al. |
| 2007/0099684 A1 | 5/2007 | Butterworth |
| 2007/0101369 A1 | 5/2007 | Dolph |
| 2007/0118801 A1 | 5/2007 | Harshbarger et al. |
| 2007/0154169 A1 | 7/2007 | Cordray et al. |
| 2007/0157234 A1 | 7/2007 | Walker |
| 2007/0157260 A1 | 7/2007 | Walker |
| 2007/0157261 A1 | 7/2007 | Steelberg et al. |
| 2007/0162395 A1 | 7/2007 | Ben-Yaacov et al. |
| 2007/0180488 A1 | 8/2007 | Walter et al. |
| 2007/0220583 A1 | 9/2007 | Bailey et al. |
| 2007/0226761 A1 | 9/2007 | Zalewski et al. |
| 2007/0239754 A1 | 10/2007 | Schnitman |
| 2007/0253677 A1 | 11/2007 | Wang |
| 2007/0253688 A1 | 11/2007 | Koennecke |
| 2007/0263722 A1 | 11/2007 | Fukuzawa |
| 2008/0001956 A1 | 1/2008 | Markovic et al. |
| 2008/0019445 A1 | 1/2008 | Aono et al. |
| 2008/0021187 A1 | 1/2008 | Wescott et al. |
| 2008/0021874 A1 | 1/2008 | Dahl et al. |
| 2008/0022320 A1 | 1/2008 | Ver Steeg |
| 2008/0031595 A1 | 2/2008 | Cho |
| 2008/0036875 A1 | 2/2008 | Jones et al. |
| 2008/0086456 A1 | 4/2008 | Rasanen et al. |
| 2008/0086754 A1 | 4/2008 | Chen et al. |
| 2008/0091721 A1 | 4/2008 | Harboe et al. |
| 2008/0092159 A1 | 4/2008 | Dmitriev et al. |
| 2008/0139301 A1 | 6/2008 | Holthe |
| 2008/0148152 A1 | 6/2008 | Blinnikka et al. |
| 2008/0161111 A1 | 7/2008 | Schuman |
| 2008/0170687 A1 | 7/2008 | Moors et al. |
| 2008/0177893 A1 | 7/2008 | Bowra et al. |
| 2008/0178232 A1 | 7/2008 | Velusamy |
| 2008/0238938 A1 | 10/2008 | Eklund et al. |
| 2008/0276157 A1 | 11/2008 | Kustka et al. |
| 2008/0300967 A1 | 12/2008 | Buckley et al. |
| 2008/0301750 A1 | 12/2008 | Silfvast et al. |
| 2008/0314232 A1 | 12/2008 | Hansson et al. |
| 2009/0022015 A1 | 1/2009 | Harrison |
| 2009/0022165 A1 | 1/2009 | Candelore et al. |
| 2009/0024923 A1 | 1/2009 | Hartwig et al. |
| 2009/0027337 A1 | 1/2009 | Hildreth |
| 2009/0029771 A1 | 1/2009 | Donahue |
| 2009/0055880 A1 | 2/2009 | Batteram et al. |
| 2009/0063681 A1 | 3/2009 | Ramakrishnan et al. |
| 2009/0063995 A1 | 3/2009 | Baron et al. |
| 2009/0077137 A1 | 3/2009 | Weda et al. |
| 2009/0079663 A1 | 3/2009 | Chang et al. |
| 2009/0080860 A1 | 3/2009 | Nakano |
| 2009/0083631 A1 | 3/2009 | Sidi et al. |
| 2009/0116817 A1 | 5/2009 | Kim et al. |
| 2009/0131764 A1 | 5/2009 | Lee et al. |
| 2009/0133051 A1 | 5/2009 | Hildreth |
| 2009/0133071 A1 | 5/2009 | Sakai et al. |
| 2009/0138805 A1 | 5/2009 | Hildreth |
| 2009/0177538 A1 | 7/2009 | Brewer et al. |
| 2009/0178089 A1 | 7/2009 | Picco et al. |
| 2009/0191971 A1 | 7/2009 | Avent |
| 2009/0195652 A1 | 8/2009 | Gal |
| 2009/0199697 A1 | 8/2009 | Lehtiniemi et al. |
| 2009/0210790 A1 | 8/2009 | Thomas |
| 2009/0226046 A1 | 9/2009 | Shteyn |
| 2009/0228572 A1 | 9/2009 | Wall et al. |
| 2009/0254827 A1 | 10/2009 | Gonze et al. |
| 2009/0258708 A1 | 10/2009 | Figueroa |
| 2009/0265737 A1 | 10/2009 | Issa et al. |
| 2009/0265746 A1 | 10/2009 | Halen et al. |
| 2009/0282454 A1 | 11/2009 | Ekstrand |
| 2009/0297118 A1 | 12/2009 | Fink et al. |
| 2009/0320075 A1 | 12/2009 | Marko |
| 2010/0017820 A1 | 1/2010 | Thevathasan et al. |
| 2010/0042496 A1 | 2/2010 | Wang et al. |
| 2010/0050083 A1 | 2/2010 | Axen et al. |
| 2010/0069159 A1 | 3/2010 | Yamada et al. |
| 2010/0070987 A1 | 3/2010 | Amento et al. |
| 2010/0077290 A1 | 3/2010 | Pueyo |
| 2010/0088726 A1 | 4/2010 | Curtis et al. |

(56) References Cited

U.S. PATENT DOCUMENTS

| | | |
|---|---|---|
| 2010/0122286 A1 | 5/2010 | Begeja et al. |
| 2010/0146145 A1 | 6/2010 | Tippin et al. |
| 2010/0153512 A1 | 6/2010 | Balassanian et al. |
| 2010/0153885 A1 | 6/2010 | Yates |
| 2010/0161792 A1 | 6/2010 | Palm et al. |
| 2010/0162344 A1 | 6/2010 | Casagrande et al. |
| 2010/0167816 A1 | 7/2010 | Perlman et al. |
| 2010/0167819 A1 | 7/2010 | Schell |
| 2010/0186032 A1 | 7/2010 | Pradeep et al. |
| 2010/0186579 A1 | 7/2010 | Schnitman |
| 2010/0199299 A1 | 8/2010 | Chang et al. |
| 2010/0210351 A1 | 8/2010 | Berman |
| 2010/0251295 A1 | 9/2010 | Amento et al. |
| 2010/0262336 A1 | 10/2010 | Rivas et al. |
| 2010/0267450 A1 | 10/2010 | McMain |
| 2010/0268361 A1 | 10/2010 | Mantel et al. |
| 2010/0278509 A1 | 11/2010 | Nagano et al. |
| 2010/0287033 A1 | 11/2010 | Mathur |
| 2010/0287475 A1 | 11/2010 | van Zwol et al. |
| 2010/0293073 A1 | 11/2010 | Schmidt |
| 2010/0293455 A1 | 11/2010 | Bloch |
| 2010/0312670 A1 | 12/2010 | Dempsey |
| 2010/0325135 A1 | 12/2010 | Chen et al. |
| 2010/0332404 A1 | 12/2010 | Valin |
| 2011/0000797 A1 | 1/2011 | Henry |
| 2011/0007797 A1 | 1/2011 | Palmer et al. |
| 2011/0010742 A1 | 1/2011 | White |
| 2011/0026898 A1 | 2/2011 | Lussier et al. |
| 2011/0033167 A1 | 2/2011 | Arling et al. |
| 2011/0041059 A1 | 2/2011 | Amarasingham et al. |
| 2011/0060993 A1 | 3/2011 | Cotter et al. |
| 2011/0069940 A1 | 3/2011 | Shimy et al. |
| 2011/0078023 A1 | 3/2011 | Aldrey et al. |
| 2011/0078740 A1 | 3/2011 | Bolyukh et al. |
| 2011/0096225 A1 | 4/2011 | Candelore |
| 2011/0125512 A1 | 5/2011 | Huang |
| 2011/0126106 A1 | 5/2011 | Ben Shaul et al. |
| 2011/0131493 A1 | 6/2011 | Dahl |
| 2011/0138331 A1 | 6/2011 | Pugsley et al. |
| 2011/0163969 A1 | 7/2011 | Anzures et al. |
| 2011/0169603 A1 | 7/2011 | Fithian et al. |
| 2011/0182366 A1 | 7/2011 | Frojdh et al. |
| 2011/0191684 A1 | 8/2011 | Greenberg |
| 2011/0191801 A1 | 8/2011 | Vytheeswaran |
| 2011/0193982 A1 | 8/2011 | Kook et al. |
| 2011/0197131 A1 | 8/2011 | Duffin et al. |
| 2011/0200116 A1 | 8/2011 | Bloch et al. |
| 2011/0202562 A1 | 8/2011 | Bloch et al. |
| 2011/0238494 A1 | 9/2011 | Park |
| 2011/0239246 A1 | 9/2011 | Woodward et al. |
| 2011/0246661 A1 | 10/2011 | Manzari et al. |
| 2011/0246885 A1 | 10/2011 | Pantos et al. |
| 2011/0252031 A1 | 10/2011 | Blumenthal et al. |
| 2011/0252320 A1 | 10/2011 | Arrasvuori et al. |
| 2011/0264755 A1 | 10/2011 | Salvatore De Villiers |
| 2011/0282745 A1 | 11/2011 | Meoded et al. |
| 2011/0282906 A1 | 11/2011 | Wong |
| 2011/0293240 A1 | 12/2011 | Newton et al. |
| 2011/0307786 A1 | 12/2011 | Shuster |
| 2011/0307919 A1 | 12/2011 | Weeraasinghe |
| 2011/0307920 A1 | 12/2011 | Blanchard et al. |
| 2011/0313859 A1 | 12/2011 | Stillwell et al. |
| 2011/0314030 A1 | 12/2011 | Burba et al. |
| 2012/0004960 A1 | 1/2012 | Ma et al. |
| 2012/0005287 A1 | 1/2012 | Gadel et al. |
| 2012/0011438 A1 | 1/2012 | Kim et al. |
| 2012/0017141 A1 | 1/2012 | Eelen et al. |
| 2012/0026166 A1 | 2/2012 | Takeda et al. |
| 2012/0062576 A1 | 3/2012 | Rosenthal et al. |
| 2012/0072420 A1 | 3/2012 | Moganti et al. |
| 2012/0081389 A1 | 4/2012 | Dilts |
| 2012/0089911 A1 | 4/2012 | Hosking et al. |
| 2012/0090000 A1 | 4/2012 | Cohen et al. |
| 2012/0094768 A1 | 4/2012 | McCaddon et al. |
| 2012/0105723 A1 | 5/2012 | van Coppenolle et al. |
| 2012/0110618 A1 | 5/2012 | Kilar et al. |
| 2012/0110620 A1 | 5/2012 | Kilar et al. |
| 2012/0117145 A1 | 5/2012 | Clift et al. |
| 2012/0120114 A1 | 5/2012 | You et al. |
| 2012/0134646 A1 | 5/2012 | Alexander |
| 2012/0137015 A1 | 5/2012 | Sun |
| 2012/0147954 A1 | 6/2012 | Kasai et al. |
| 2012/0159530 A1 | 6/2012 | Ahrens et al. |
| 2012/0159541 A1 | 6/2012 | Carton et al. |
| 2012/0179970 A1 | 7/2012 | Hayes |
| 2012/0198412 A1 | 8/2012 | Creighton et al. |
| 2012/0198489 A1 | 8/2012 | O'Connell et al. |
| 2012/0213495 A1 | 8/2012 | Hafeneger et al. |
| 2012/0225693 A1 | 9/2012 | Sirpal et al. |
| 2012/0233631 A1 | 9/2012 | Geshwind |
| 2012/0246032 A1 | 9/2012 | Beroukhim et al. |
| 2012/0263263 A1 | 10/2012 | Olsen et al. |
| 2012/0308206 A1 | 12/2012 | Kulas |
| 2012/0317198 A1 | 12/2012 | Patton et al. |
| 2012/0324491 A1 | 12/2012 | Bathiche et al. |
| 2013/0021269 A1 | 1/2013 | Johnson et al. |
| 2013/0024888 A1 | 1/2013 | Sivertsen |
| 2013/0028446 A1 | 1/2013 | Krzyzanowski |
| 2013/0028573 A1 | 1/2013 | Hoofien et al. |
| 2013/0031582 A1 | 1/2013 | Tinsman et al. |
| 2013/0033542 A1 | 2/2013 | Nakazawa |
| 2013/0036200 A1 | 2/2013 | Roberts et al. |
| 2013/0039632 A1 | 2/2013 | Feinson |
| 2013/0046847 A1 | 2/2013 | Zavesky et al. |
| 2013/0054728 A1 | 2/2013 | Amir et al. |
| 2013/0055321 A1 | 2/2013 | Cline et al. |
| 2013/0061263 A1 | 3/2013 | Issa et al. |
| 2013/0073775 A1 | 3/2013 | Wade et al. |
| 2013/0094830 A1 | 4/2013 | Stone et al. |
| 2013/0097410 A1 | 4/2013 | Bourges-Sevenier |
| 2013/0097643 A1 | 4/2013 | Stone et al. |
| 2013/0117248 A1 | 5/2013 | Bhogal et al. |
| 2013/0125181 A1 | 5/2013 | Montemayor et al. |
| 2013/0129304 A1 | 5/2013 | Feinson |
| 2013/0129308 A1 | 5/2013 | Karn et al. |
| 2013/0167168 A1 | 6/2013 | Ellis et al. |
| 2013/0173765 A1 | 7/2013 | Korbecki |
| 2013/0177294 A1 | 7/2013 | Kennberg |
| 2013/0188923 A1 | 7/2013 | Hartley et al. |
| 2013/0195427 A1 | 8/2013 | Sathish |
| 2013/0202265 A1 | 8/2013 | Arrasvuori et al. |
| 2013/0204710 A1 | 8/2013 | Boland et al. |
| 2013/0205314 A1 | 8/2013 | Ramaswamy et al. |
| 2013/0219425 A1 | 8/2013 | Swartz |
| 2013/0235152 A1 | 9/2013 | Hannuksela et al. |
| 2013/0235270 A1 | 9/2013 | Sasaki et al. |
| 2013/0254292 A1 | 9/2013 | Bradley |
| 2013/0259442 A1 | 10/2013 | Bloch et al. |
| 2013/0268620 A1 | 10/2013 | Osminer |
| 2013/0271453 A1 | 10/2013 | Ruotsalainen et al. |
| 2013/0282917 A1 | 10/2013 | Reznik et al. |
| 2013/0283401 A1 | 10/2013 | Pabla et al. |
| 2013/0290818 A1 | 10/2013 | Arrasvuori et al. |
| 2013/0298146 A1 | 11/2013 | Conrad et al. |
| 2013/0308926 A1 | 11/2013 | Jang et al. |
| 2013/0328888 A1 | 12/2013 | Beaver et al. |
| 2013/0330055 A1 | 12/2013 | Zimmermann et al. |
| 2013/0335427 A1 | 12/2013 | Cheung et al. |
| 2014/0015940 A1 | 1/2014 | Yoshida |
| 2014/0019865 A1 | 1/2014 | Shah |
| 2014/0025620 A1 | 1/2014 | Greenzeiger et al. |
| 2014/0025839 A1 | 1/2014 | Marko et al. |
| 2014/0040273 A1 | 2/2014 | Cooper et al. |
| 2014/0040280 A1 | 2/2014 | Slaney et al. |
| 2014/0046946 A2 | 2/2014 | Friedmann et al. |
| 2014/0068648 A1 | 3/2014 | Green et al. |
| 2014/0078397 A1 | 3/2014 | Bloch et al. |
| 2014/0082666 A1 | 3/2014 | Bloch et al. |
| 2014/0085196 A1 | 3/2014 | Zucker et al. |
| 2014/0086445 A1 | 3/2014 | Brubeck et al. |
| 2014/0094313 A1 | 4/2014 | Watson et al. |
| 2014/0101550 A1 | 4/2014 | Zises |
| 2014/0105420 A1 | 4/2014 | Lee |
| 2014/0109165 A1 | 4/2014 | Friedman |

(56) References Cited

U.S. PATENT DOCUMENTS

| | | |
|---|---|---|
| 2014/0115114 A1 | 4/2014 | Garmark et al. |
| 2014/0126877 A1 | 5/2014 | Crawford et al. |
| 2014/0129618 A1 | 5/2014 | Panje et al. |
| 2014/0136186 A1 | 5/2014 | Adami et al. |
| 2014/0143298 A1 | 5/2014 | Klotzer et al. |
| 2014/0152564 A1 | 6/2014 | Gulezian et al. |
| 2014/0156677 A1 | 6/2014 | Collins, III et al. |
| 2014/0161417 A1 | 6/2014 | Kurupacheril et al. |
| 2014/0173650 A1 | 6/2014 | Mathews et al. |
| 2014/0178051 A1 | 6/2014 | Bloch et al. |
| 2014/0186008 A1 | 7/2014 | Eyer |
| 2014/0194211 A1 | 7/2014 | Chimes et al. |
| 2014/0210860 A1 | 7/2014 | Caissy |
| 2014/0219630 A1 | 8/2014 | Minder |
| 2014/0220535 A1 | 8/2014 | Angelone |
| 2014/0237520 A1 | 8/2014 | Rothschild et al. |
| 2014/0245152 A1 | 8/2014 | Carter et al. |
| 2014/0259844 A1 | 9/2014 | Kruse |
| 2014/0270680 A1 | 9/2014 | Bloch et al. |
| 2014/0279032 A1 | 9/2014 | Roever et al. |
| 2014/0282013 A1 | 9/2014 | Amijee |
| 2014/0282642 A1 | 9/2014 | Needham et al. |
| 2014/0298173 A1 | 10/2014 | Rock |
| 2014/0314239 A1 | 10/2014 | Meyer et al. |
| 2014/0317638 A1 | 10/2014 | Hayes |
| 2014/0357362 A1 | 12/2014 | Cohen |
| 2014/0380167 A1 | 12/2014 | Bloch et al. |
| 2015/0007234 A1 | 1/2015 | Rasanen et al. |
| 2015/0012369 A1 | 1/2015 | Dharmaji et al. |
| 2015/0015789 A1 | 1/2015 | Guntur et al. |
| 2015/0020086 A1 | 1/2015 | Chen et al. |
| 2015/0033266 A1 | 1/2015 | Klappert et al. |
| 2015/0046946 A1 | 2/2015 | Hassell et al. |
| 2015/0058342 A1 | 2/2015 | Kim et al. |
| 2015/0063781 A1 | 3/2015 | Silverman et al. |
| 2015/0067596 A1 | 3/2015 | Brown et al. |
| 2015/0067723 A1 | 3/2015 | Bloch et al. |
| 2015/0070458 A1 | 3/2015 | Kim et al. |
| 2015/0070516 A1 | 3/2015 | Shoemake et al. |
| 2015/0074721 A1 | 3/2015 | Fishman et al. |
| 2015/0086174 A1 | 3/2015 | Abecassis et al. |
| 2015/0104144 A1 | 4/2015 | Minemura |
| 2015/0104155 A1 | 4/2015 | Bloch et al. |
| 2015/0106845 A1 | 4/2015 | Popkiewicz et al. |
| 2015/0124171 A1 | 5/2015 | King |
| 2015/0154439 A1 | 6/2015 | Anzue et al. |
| 2015/0160853 A1 | 6/2015 | Hwang et al. |
| 2015/0179224 A1 | 6/2015 | Bloch et al. |
| 2015/0181271 A1 | 6/2015 | Onno et al. |
| 2015/0181291 A1 | 6/2015 | Wheatley |
| 2015/0181301 A1 | 6/2015 | Bloch et al. |
| 2015/0185965 A1 | 7/2015 | Belliveau et al. |
| 2015/0195601 A1 | 7/2015 | Hahm |
| 2015/0199116 A1 | 7/2015 | Bloch et al. |
| 2015/0201187 A1 | 7/2015 | Ryo |
| 2015/0228307 A1 | 8/2015 | Cabanero |
| 2015/0256861 A1 | 9/2015 | Oyman |
| 2015/0258454 A1 | 9/2015 | King et al. |
| 2015/0278986 A1 | 10/2015 | Edwin et al. |
| 2015/0286716 A1 | 10/2015 | Snibbe et al. |
| 2015/0293675 A1 | 10/2015 | Bloch et al. |
| 2015/0294685 A1 | 10/2015 | Bloch et al. |
| 2015/0304698 A1 | 10/2015 | Redol |
| 2015/0310660 A1 | 10/2015 | Mogilefsky et al. |
| 2015/0318018 A1 | 11/2015 | Kaiser et al. |
| 2015/0331485 A1 | 11/2015 | Wilairat et al. |
| 2015/0331933 A1 | 11/2015 | Tocchini, IV et al. |
| 2015/0331942 A1 | 11/2015 | Tan |
| 2015/0348325 A1 | 12/2015 | Voss |
| 2015/0373385 A1 | 12/2015 | Straub |
| 2016/0009487 A1 | 1/2016 | Edwards et al. |
| 2016/0021412 A1 | 1/2016 | Zito, Jr. |
| 2016/0029002 A1 | 1/2016 | Balko |
| 2016/0037217 A1 | 2/2016 | Harmon et al. |
| 2016/0057497 A1 | 2/2016 | Kim et al. |
| 2016/0062540 A1 | 3/2016 | Yang et al. |
| 2016/0065831 A1 | 3/2016 | Howard et al. |
| 2016/0066051 A1 | 3/2016 | Caidar et al. |
| 2016/0086585 A1 | 3/2016 | Sugimoto |
| 2016/0094875 A1 | 3/2016 | Peterson et al. |
| 2016/0099024 A1 | 4/2016 | Gilley |
| 2016/0100226 A1 | 4/2016 | Sadler et al. |
| 2016/0104513 A1 | 4/2016 | Bloch et al. |
| 2016/0105724 A1 | 4/2016 | Bloch et al. |
| 2016/0132203 A1 | 5/2016 | Seto et al. |
| 2016/0134946 A1 | 5/2016 | Glover et al. |
| 2016/0142889 A1 | 5/2016 | O'Connor et al. |
| 2016/0150278 A1 | 5/2016 | Greene |
| 2016/0162179 A1 | 6/2016 | Annett et al. |
| 2016/0170948 A1 | 6/2016 | Bloch |
| 2016/0173944 A1 | 6/2016 | Kilar et al. |
| 2016/0192009 A1 | 6/2016 | Sugio et al. |
| 2016/0217829 A1 | 7/2016 | Bloch et al. |
| 2016/0224573 A1 | 8/2016 | Shahraray et al. |
| 2016/0232579 A1 | 8/2016 | Fahnestock |
| 2016/0277779 A1 | 9/2016 | Zhang et al. |
| 2016/0303608 A1 | 10/2016 | Jossick |
| 2016/0321689 A1 | 11/2016 | Turgeman |
| 2016/0322054 A1 | 11/2016 | Bloch et al. |
| 2016/0323608 A1 | 11/2016 | Bloch et al. |
| 2016/0337691 A1 | 11/2016 | Prasad et al. |
| 2016/0344873 A1 | 11/2016 | Jenzeh et al. |
| 2016/0365117 A1 | 12/2016 | Boliek et al. |
| 2016/0366454 A1 | 12/2016 | Tatourian et al. |
| 2017/0006322 A1 | 1/2017 | Dury et al. |
| 2017/0032562 A1 | 2/2017 | Block et al. |
| 2017/0041372 A1 | 2/2017 | Hosur |
| 2017/0062012 A1 | 3/2017 | Bloch et al. |
| 2017/0142486 A1 | 5/2017 | Masuda |
| 2017/0149795 A1 | 5/2017 | Day, II |
| 2017/0178409 A1 | 6/2017 | Bloch et al. |
| 2017/0178601 A1 | 6/2017 | Bloch et al. |
| 2017/0185596 A1 | 6/2017 | Spirer |
| 2017/0195736 A1 | 7/2017 | Chai et al. |
| 2017/0264920 A1 | 9/2017 | Mickelsen |
| 2017/0280181 A1 | 9/2017 | Ramaley |
| 2017/0286424 A1 | 10/2017 | Peterson |
| 2017/0289220 A1 | 10/2017 | Bloch et al. |
| 2017/0295410 A1 | 10/2017 | Bloch et al. |
| 2017/0326462 A1 | 11/2017 | Lyons et al. |
| 2017/0337196 A1 | 11/2017 | Goela et al. |
| 2017/0345460 A1 | 11/2017 | Bloch et al. |
| 2018/0007443 A1 | 1/2018 | Cannistraro et al. |
| 2018/0014049 A1 | 1/2018 | Griffin et al. |
| 2018/0025078 A1 | 1/2018 | Quennesson |
| 2018/0048831 A1 | 2/2018 | Berwick et al. |
| 2018/0060430 A1 | 3/2018 | Lu |
| 2018/0068019 A1 | 3/2018 | Novikoff et al. |
| 2018/0095645 A1 | 4/2018 | Subudhi et al. |
| 2018/0115592 A1 | 4/2018 | Samineni |
| 2018/0130501 A1 | 5/2018 | Bloch et al. |
| 2018/0176573 A1 | 6/2018 | Chawla et al. |
| 2018/0191574 A1 | 7/2018 | Vishnia et al. |
| 2018/0254067 A1 | 9/2018 | Elder |
| 2018/0262798 A1 | 9/2018 | Ramachandra |
| 2018/0300852 A1 | 10/2018 | Chen et al. |
| 2018/0300858 A1 | 10/2018 | Chen et al. |
| 2018/0310049 A1 | 10/2018 | Takahashi et al. |
| 2018/0314959 A1 | 11/2018 | Apokatanidis et al. |
| 2018/0376205 A1 | 12/2018 | Oswal et al. |
| 2019/0005716 A1 | 1/2019 | Singh et al. |
| 2019/0066188 A1 | 2/2019 | Rothschild |
| 2019/0069038 A1 | 2/2019 | Phillips |
| 2019/0069039 A1 | 2/2019 | Phillips |
| 2019/0075367 A1 | 3/2019 | van Zessen et al. |
| 2019/0090002 A1 | 3/2019 | Ramadorai et al. |
| 2019/0098371 A1 | 3/2019 | Keesan |
| 2019/0104342 A1 | 4/2019 | Catalano et al. |
| 2019/0132639 A1 | 5/2019 | Panchaksharaiah et al. |
| 2019/0139314 A1 | 5/2019 | Marsh et al. |
| 2019/0166412 A1 | 5/2019 | Panchaksharaiah et al. |
| 2019/0182525 A1 | 6/2019 | Steinberg et al. |
| 2019/0238719 A1 | 8/2019 | Alameh et al. |
| 2019/0335225 A1 | 10/2019 | Fang et al. |

(56) References Cited

U.S. PATENT DOCUMENTS

| | | |
|---|---|---|
| 2019/0354936 A1 | 11/2019 | Deluca et al. |
| 2020/0023157 A1 | 1/2020 | Lewis et al. |
| 2020/0029128 A1 | 1/2020 | Erskine |
| 2020/0037047 A1 | 1/2020 | Cheung et al. |
| 2020/0059699 A1 | 2/2020 | Malev et al. |
| 2020/0169787 A1 | 5/2020 | Pearce et al. |
| 2020/0193163 A1 | 6/2020 | Chang et al. |
| 2020/0344508 A1 | 10/2020 | Edwards et al. |
| 2021/0263564 A1 | 8/2021 | Chen et al. |
| 2022/0046291 A1 | 2/2022 | Jiang et al. |
| 2022/0245209 A1 | 8/2022 | Cho et al. |

FOREIGN PATENT DOCUMENTS

| | | |
|---|---|---|
| DE | 10053720 A1 | 4/2002 |
| EP | 0965371 A2 | 12/1999 |
| EP | 1033157 A2 | 9/2000 |
| EP | 2104105 A1 | 9/2009 |
| GB | 2359916 A | 9/2001 |
| GB | 2428329 A | 1/2007 |
| JP | 2003-245471 A | 9/2003 |
| JP | 2008-005288 A | 1/2008 |
| KR | 2004-0005068 A | 1/2004 |
| KR | 2010-0037413 A | 4/2010 |
| WO | WO-1996/013810 A1 | 5/1996 |
| WO | WO-2000/059224 A1 | 10/2000 |
| WO | WO-2007/062223 A2 | 5/2007 |
| WO | WO-2007/138546 A2 | 12/2007 |
| WO | WO-2008/001350 A2 | 1/2008 |
| WO | WO-2008/052009 A2 | 5/2008 |
| WO | WO-2008/057444 A2 | 5/2008 |
| WO | WO-2009/125404 A2 | 10/2009 |
| WO | WO-2009/137919 A1 | 11/2009 |

OTHER PUBLICATIONS

U.S. Appl. No. 14/884,285 U.S. Pat. No. 11,314,936 Published as US2017/0178601, System and Method for Assembling a Recorded Composition, filed Oct. 15, 2015.
U.S. Appl. No. 13/033,916 U.S. Pat. No. 9,607,655 Published as US2011/0200116, System and Method for Seamless Multimedia Assembly, filed Feb. 24, 2011.
U.S. Appl. No. 13/034,645 U.S. Pat. No. 11,232,458 Published as US2011/0202562, System and Method for Data Mining Within Interactive Multimedia, filed Feb. 24, 2011.
U.S. Appl. No. 17/551,847 Published as US2021/0366520, Systems and Methods for Data Mining Within Interactive Multimedia, filed Dec. 15, 2021.
U.S. Appl. No. 13/437,164 U.S. Pat. No. 8,600,200 Published as US2013/0259442, Systems and Methods for Loading More Than One Video Content at a Time, filed Apr. 2, 2012.
U.S. Appl. No. 14/069,694 U.S. Pat. No. 9,271,015 Published as US2014/0178051, Systems and Methods for Loading More Than One Video Content at a Time, filed Nov. 1, 2013.
U.S. Appl. No. 13/622,780 U.S. Pat. No. 8,860,882 Published as US2014/0078397, Systems and Methods for Constructing Multimedia Content Modules, filed Sep. 19, 2012.
U.S. Appl. No. 13/622,795 U.S. Pat. No. 9,009,619 Published as US2014/0082666, Progress Bar for Branced Videos, filed Sep. 19, 2012.
U.S. Appl. No. 14/639,579 U.S. Pat. No. 10,474,334 Published as US2015/0199116, Progress Bar for Branched Videos, filed Mar. 5, 2015.
U.S. Appl. No. 13/838,830 U.S. Pat. No. 9,257,148 Published as US2014/0270680, System and Method for Synchronization of Selectably Presentable Media Streams, filed Mar. 15, 2013.
U.S. Appl. No. 14/984,821 U.S. Pat. No. 10,418,066 Published as US2016/0217829, System and Method for Synchronization of Selectably Presentable Media Streams, filed Dec. 30, 2015.

U.S. Appl. No. 13/921,536 U.S. Pat. No. 9,832,516 Published as US2014/0380167, Systems and Methods for Multiple Device Interaction with Selectably Presentable Media Streams, filed Jun. 19, 2013.
U.S. Appl. No. 14/107,600 U.S. Pat. No. 10,488,119 Published as US2015/0067723, Methods and Systems for Unfolding Video Pre-Roll, filed Dec. 16, 2013.
U.S. Appl. No. 14/335,381 U.S. Pat. No. 9,530,454 Published as U82015/0104155, Systems and Methods for Real-Time Pixel Switching, filed Jul. 18, 2014.
U.S. Appl. No. 14/139,996 U.S. Pat. No. 9,641,898 Published as US2015/0181301, Methods and Systems for In-Video Library, filed Dec. 24, 2013.
U.S. Appl. No. 14/140,007 U.S. Pat. No. 9,520,155 Published as US2015/0179224, Methods and Systems for Seeking to Non-Key Frames, filed Dec. 24, 2013.
U.S. Appl. No. 14/249,627 U.S. Pat. No. 9,653,115 Published as US2015-0294685, Systems and Methods for Creating Linear Video From Branched Video, filed Apr. 10, 2014.
U.S. Appl. No. 15/481,916 U.S. Pat. No. 10,755,747 Published as US2017-0345460, Systems and Methods for Creating Linear Video From Branched Video, filed Apr. 7, 2017.
U.S. Appl. No. 16/986,977 U.S. Pat. No. 11,501,802 Published as US2020/0365187, Systems and Methods for Creating Linear Video From Branched Video, filed Aug. 6, 2020.
U.S. Appl. No. 14/249,665 U.S. Pat. No. 9,792,026 Published as US2015/0293675, Dynamic Timeline for Branched Video, filed Apr. 10, 2014.
U.S. Appl. No. 14/509,700 U.S. Pat. No. 9,792,026 Published as US2016/0104513, Systems and Methods for Dynamic Video Bookmarking, filed Oct. 8, 2014.
U.S. Appl. No. 14/534,626 U.S. Pat. No. 10,692,540 Published as US-2018-0130501-A1, Systems and Methods for Dynamic Video Bookmarking, filed Sep. 13, 2017.
U.S. Appl. No. 16/865,896 U.S. Pat. No. 10,885,944 Published as US2020/0265870, Systems and Methods for Dynamic Video Bookmarking, filed May 4, 2020.
U.S. Appl. No. 17/138,434 U.S. Pat. No. 11,348,618 Published as US2021/0366520, Systems and Methods for Dynamic Video Bookmarking, filed Dec. 30, 2020.
U.S. Appl. No. 17/701,168 Published as US2022/0215861, Systems and Methods for Dynamic Video Bookmarking, filed Mar. 22, 2022.
U.S. Appl. No. 14/534,626 U.S. Pat. No. 11,412,276 Published as US2016/0105724, Systems and Methods for Parallel Track Transitions, filed Mar. 31, 2022.
U.S. Appl. No. 14/700,845 U.S. Pat. No. 10,582,265 Published as US2016/0323608, Systems and Methods for Nonlinear Video Playback Using Linear Real-Time Video Players, filed Apr. 30, 2015.
U.S. Appl. No. 16/752,193 Published as US2020/0404382, Systems and Methods for Nonlinear Video Playback Using Linear Real-Time Video Players, filed Jan. 24, 2020.
U.S. Appl. No. 14/700,862 U.S. Pat. No. 9,672,868 Published as US2016/0322054, Systems and Methods for Seamless Media Creation, filed Apr. 30, 2015.
U.S. Appl. No. 14/835,857 U.S. Pat. No. 10,460,765 Published as US2017/0062012, Systems and Methods for Adaptive and Responsive Video, filed Aug. 26, 2015.
U.S. Appl. No. 16/559,082 U.S. Pat. No. 11,804,249 Published as US2019/0392868, Systems and Methods for Adaptive and Responsive Video, filed Sep. 3, 2019.
U.S. Appl. No. 18/472,352, Systems and Methods for Adaptive and Responsive Video, filed Sep. 22, 2023.
U.S. Appl. No. 14/978,464 U.S. Pat. No. 11,164,548 Published as US2017/0178601, Intelligent Buffering of Large-Scale Video, filed Dec. 22, 2015.
U.S. Appl. No. 14/978,491 U.S. Pat. No. 11,128,853 Published as US2017/0178409, Seamless Transitions in Large-Scale Video, filed Dec. 22, 2015.
U.S. Appl. No. 17/403,703 Published as US2022/0038673, Seamless Transitions in Large-Scale Video, filed Aug. 16, 2021.
U.S. Appl. No. 15/085,209 U.S. Pat. No. 10,462,202 Published as US2017/0289220, Media Stream Rate Synchronization, filed Mar. 30, 2016.

(56) References Cited

OTHER PUBLICATIONS

U.S. Appl. No. 15/165,373 Published as US2017/0295410, Symbiotic Interactive Video, filed May 26, 2016.
U.S. Appl. No. 15/189,931 U.S. Pat. No. 10,218,760 Published as US2017/0374120, Dynamic Summary Generation for Real-time Switchable Videos, filed Jun. 22, 2016.
U.S. Appl. No. 15/395,477 U.S. Pat. No. 11,050,809 Published as US2018/0191574, Systems and Methods for Dynamic Weighting of Branched Video Paths, filed Dec. 30, 2016.
U.S. Appl. No. 17/328,261 U.S. Pat. No. 11,553,024 Published as US2021/0281626, Systems and Methods for Dynamic Weighting of Branched Video Paths, filed May 24, 2021.
U.S. Appl. No. 15/997,284 U.S. Pat. No. 11,601,721 Published as US2019/0373330, Interactive video dynamic adaption and user profiling, filed Jun. 4, 2018.
U.S. Appl. No. 15/863,191 U.S. Pat. No. 10,257,578, Dynamic Library Display for Interactive Videos, filed Jan. 5, 2018.
U.S. Appl. No. 16/283,066 U.S. Pat. No. 10,856,049 Published as US2019/0349637, Dynamic Libaray Display for Interactive Videos, filed Feb. 22, 2019.
U.S. Appl. No. 17/091,149 U.S. Pat. No. 11,528,534 Published as US2021/0306707, Dynamic Library Display for Interactive Videos, filed Nov. 6, 2020.
U.S. Appl. No. 16/591,103 U.S. Pat. No. 11,490,047 Published as US2021/0105433, Systems and Methods for Dynamically Adjusting Video Aspect Ratios, filed Oct. 2, 2019.
U.S. Appl. No. 16/793,205 Published as US2021/0258647, Dynamic adaptation of interactive video players using behavioral analytics, filed Feb. 18, 2020.
U.S. Appl. No. 16/793,201 U.S. Pat. No. 11,245,961 Published as 2021/0258640, Systems and Methods for Detecting Anomalous Activities for Interactive Videos, filed Feb. 18, 2020.
U.S. Appl. No. 16/922,540 Published as US2022/0014817, Systems and Methods for Seamless Audio and Video Endpoint Transitions, filed Jul. 7, 2020.
U.S. Appl. No. 17/462,199 Published as US2023/0076702, Shader-based dynamic video manipulation, filed Aug. 31, 2021.
U.S. Appl. No. 17/462,222 Published as US2023/0076702, Shader-based dynamic video manipulation, filed Aug. 31, 2021.
U.S. Appl. No. 17/334,027 Published as US2022/0385982, Automated platform for generating interactive videos, filed May 28, 2021.
U.S. Appl. No. 17/484,604 Published as US2023/0101675, Discovery engine for interactive videos, filed Sep. 24, 2021.
U.S. Appl. No. 17/484,635 Published as US2023/0101763, Video player integration within websites, filed Sep. 24, 2021.
U.S. Appl. No. 18/331,494, Automated Production Plan for Product Videos, filed Jun. 8, 2023.
U.S. Appl. No. 18/504,390, Automatic Post-Production for Product Videos, filed Nov. 8, 2023.
An ffmpeg and SDL Tutorial, "Tutorial 05: Synching Video," Retrieved from internet on Mar. 15, 2013: <http://dranger.com/ffmpeg/tutorial05.html>, 4 pages.
Archos Gen 5 English User Manual Version 3.0, Jul. 26, 2007, pp. 1-81.
Barlett M, (2008), "iTunes 11: How to Queue Next Song," *Technipages,* Oct. 6, 2008 issue, pp. 1-8, retrieved on Dec. 26, 2013 from the internet: http://www.technipages.com/itunes-queue-next-song.html.
Bodaghi, A et al., "Personalization of Interactive Recommender Systems for Expert Users", 4th International Conference on the Web Research (ICWR), (2018), pp. 58-62.
Google Scholar search, "Inserting metadata insertion advertising video", Jul. 16, 2021, 2 pages.
International Preliminary Report and Written Opinion of PCT/IL2012/000080 dated Aug. 27, 2013, 7 pages.
International Search Report and Written Opinion for International Patent Application PCT/IB2013/001000 mailed Jul. 31, 2013 (5 pages).
International Search Report for International Patent Application PCT/IL2010/000362 dated Aug. 25, 2010 (2 pages).
International Search Report for International Patent Application PCT/IL2012/000081 dated Jun. 28, 2012 (4 pages).
International Search Report of PCT/IL2012/000080 dated Aug. 9, 2012, 4 pages.
Labs.byHook: "Ogg Vorbis Encoder for Flash: Alchemy Series Part 1," [Online] Internet Article, Retrieved on Jun. 14, 2012 from the Internet: URL:http://labs.byhook.com/2011/02/15/ogg-vorbis-encoder-for-flash-alchemy-series-part-1/, 2011, (pp. 1-6).
Marciel, M et al., "Understanding the Detection of View Fraud in Video Content Portals", (Feb. 5, 2016), Cornell University, pp. 1-13.
Miller, Gregor et al., "MiniDiver: A Novel Mobile Media Playback Interface for Rich Video Content on an iPhoneTM", Entertainment Computing A ICEC 2009, Sep. 3, 2009, pp. 98-109.
Sodagar, I., "The MPEG-DASH Standard for Multimedia Streaming Over the Internet", IEEE Multimedia, IEEE Service Center, New York, NY US, (2011) 18(4): 62-67.
Supplemental European Search Report for EP10774637.2 (PCT/IL2010/000362) mailed Jun. 28, 2012 (7 pages).
Supplemental European Search Report for EP13184145, (Jan. 30, 2014), 5 pages.
Yang, H, et al., "Time Stamp Synchronization in Video Systems," (Oct. 1, 2010) Teletronics Technology Corporation, <http://www.ttcdas.com/products/daus_encoders/pdf/_tech_papers/tp_2010_time_stamp_video_system.pdf>, Abstract, (8 pages).

SHOPPING LIST

| | | |
|---|---|---|
|  | Garlic bag | > |
|  | Red Wine vinegar, 12.7 fl. oz | > |
|  | Sweet Italian Style Chicken Sausage, 11 oz | > |
|  | Classic Olive Oil, 17 fl. oz | > |
|  | Fresh Rosemary, 0.5 oz | > |
|  | Kale Greens, bunch | > |
|  | Nut & Honey Trail Mix, 26 oz | > |

AUTOMATED PLATFORM FOR GENERATING INTERACTIVE VIDEOS

CROSS-REFERENCE TO RELATED APPLICATIONS

This application is a Continuation of U.S. application Ser. No. 17/334,027 filed on May 28, 2021, which is hereby incorporated by reference in its entirety.

TECHNICAL FIELD

The following disclosure is directed to methods and systems for generating interactive videos and, more specifically, an automated platform for generating interactive videos.

BACKGROUND

Websites often present information about a given product for the purpose of selling the product to a customer of the website. Some of these websites include videos visually presenting the product (e.g., a new vehicle, a power tool, a toy, a bouquet of flowers, etc.). However, such videos are typically predetermined and unalterable by the video developer or the user.

SUMMARY

Disclosed herein are systems and methods for generating interactive videos on an automated platform.

In one aspect, the disclosure features a method for generating interactive videos on an automated platform. The method can include receiving data associated with at least one physical item; receiving video content comprising a visual presentation of the physical item, and receiving a selection of a predetermined template. The template can include a plurality of modules organized in a tree structure. The method includes organizing the video content into the predetermined template to form organized video content, and embedding an object in a portion of the organized video content to form an interactive video. The object is based on the received data and is configured to enable at least one of: (i) user interaction with the physical item; or (ii) a link to a webpage associated with the physical item.

Various embodiments of the method can include one or more of the following features.

The received data can be received via an application program interface (API). The received data can include at least one of: (a) an image of the physical item; (b) a review of the physical item; (c) a text description of the physical item; (d) an inventory status of the physical item; or (e) at least one tag associated with the physical item. The received data can be inputted by a user of the platform, and wherein the received data comprises at least one of: (i) an identification number associated with the physical item; (ii) a webpage link associated with the physical item; (iii) a text description of the physical item; (iv) at least one tag associated with the physical item; or (v) at least one feature of the physical item and, for each feature, a respective interaction type. The webpage can be configured to enable purchase of the physical item.

The webpage can be configured to present information associated with the physical item. The method can include receiving a modification of the predetermined template, the modification being at least one of: (a) an addition of one or more modules to the tree structure; or (b) a modification of a connection between two modules of the tree structure. The predetermined template can be based on the physical item. The portion of the organized video can be assigned to a module of the plurality of modules. Transmitting the interactive video for presentation can include transmitting the interactive video to a website or an application.

In another aspect, the disclosure features a system for generating interactive videos on an automated platform. The system can include at least one memory for storing computer-executable instructions; and at least one processor for executing the instructions stored on the memory. The execution of the instructions can program the at least one processor to perform operations include receiving data associated with at least one physical item; receiving video content comprising a visual presentation of the physical item; and receiving a selection of a predetermined template, the template comprising a plurality of modules organized in a tree structure. The operations can include organizing the video content into the predetermined template to form organized video content; and embedding an object in a portion of the organized video to form an interactive video. The object can be based on the received data and is configured to enable at least one of: (i) user interaction with the physical item; or (ii) a link to a webpage associated with the physical item.

Various embodiments of the system can include one or more of the following features. The received data can be received via an application program interface (API). The received data comprises at least one of: (a) an image of the physical item; (b) a review of the physical item; (c) a text description of the physical item; (d) an inventory status of the physical item; or (e) at least one tag associated with the physical item. The received data is inputted by a user of the platform, and wherein the received data comprises at least one of: (i) an identification number associated with the physical item; (ii) a webpage link associated with the physical item; (iii) a text description of the physical item; (iv) at least one tag associated with the physical item; or (v) at least one feature of the physical item and, for each feature, a respective interaction type.

The webpage can be configured to enable purchase of the physical item. The webpage can be configured to present information associated with the physical item. The operations can include receiving a modification of the predetermined template. The modification can be at least one of: (a) an addition of one or more modules to the tree structure; or (b) a modification of a connection between two modules of the tree structure. The predetermined template can be based on the physical item. The portion of the organized video can be assigned to a module of the plurality of modules. Transmitting the interactive video for presentation can include transmitting the interactive video to a website or an application.

BRIEF DESCRIPTION OF THE DRAWINGS

A more complete appreciation of the invention and many attendant advantages thereof will be readily obtained as the same becomes better understood by reference to the following detailed description when considered in connection with the accompanying drawings. In the drawings, like reference characters generally refer to the same parts throughout the different views. Further, the drawings are not necessarily to scale, with emphasis instead generally being placed upon illustrating the principles of the invention.

DETAILED DESCRIPTION

Disclosed herein are exemplary embodiments of systems and methods for generating interactive videos. In particular, described are various embodiments of an automated platform for generating interactive videos.

High-Level System Architecture

Figure 1:
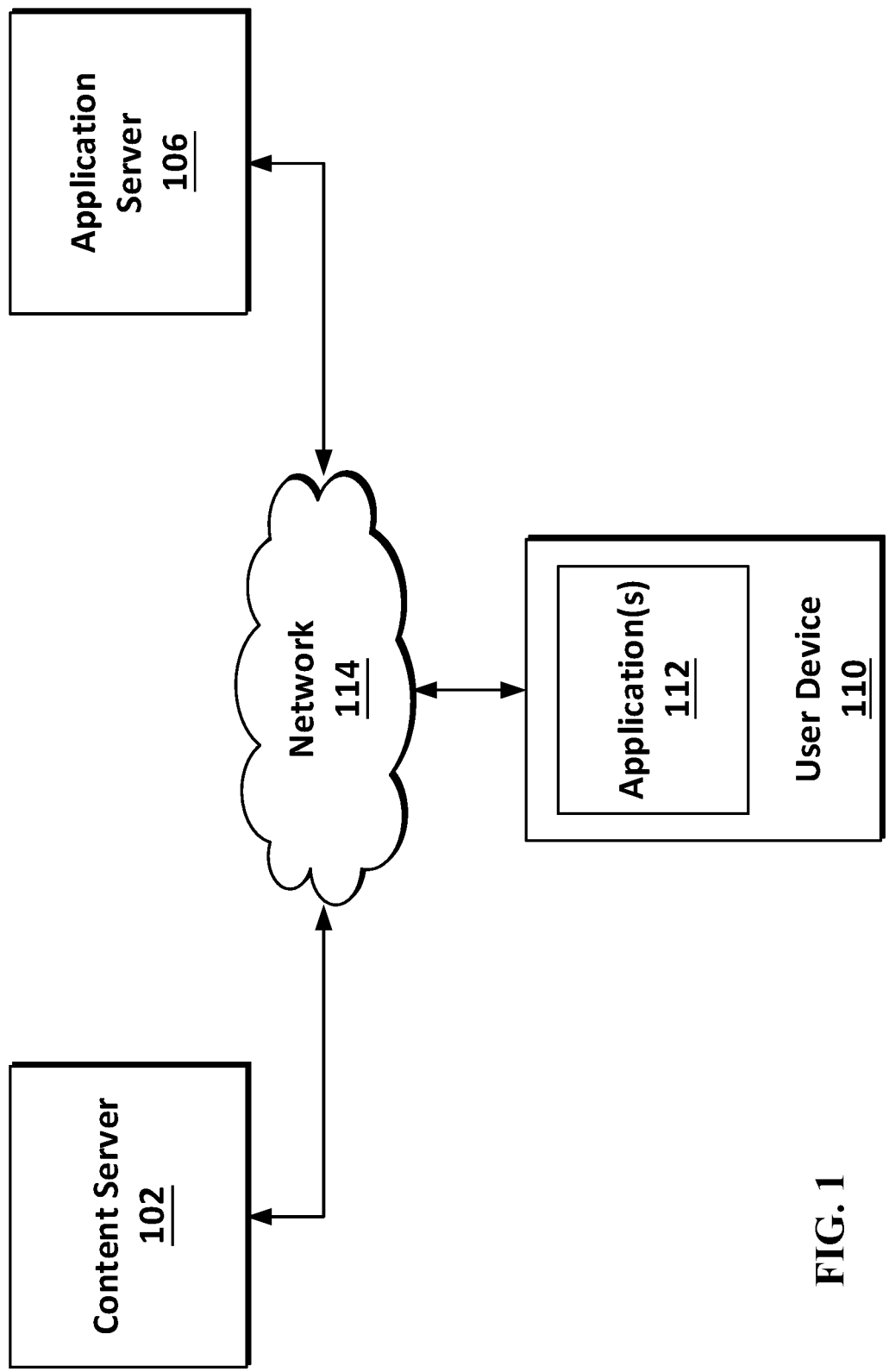
FIG. 1 depicts a high-level system architecture for providing interactive media content according to an implementation.

FIG. 1 depicts a high-level architecture of such a system according to an implementation. A media presentation having multiple video and/or audio streams can be presented to a user on a user device 110 having one or more application(s) 112 that together are capable of playing and/or editing the content and displaying a video library where information associated with videos can browsed and videos can be selected for playback. The user device 110 can be, for example, a smartphone, tablet, laptop, desktop, palmtop, television, gaming device, virtual reality headset, smart glasses, smart watch, music player, mobile telephone, workstation, or other computing device configured to execute the functionality described herein. The user device 110 can have output functionality (e.g., display monitor, touchscreen, image projector, etc.) and input functionality (e.g., touchscreen, keyboard, mouse, remote control, etc.).

The application 112 can be a video player/editor and library browser that is implemented as a native application, web application, or other form of software. In some implementations, the application 112 is in the form of a web page, widget, and/or Java, JavaScript, .Net, Silverlight, Flash, and/or other applet or plug-in that is downloaded to the user device 110 and runs in conjunction with a web browser. The application 112 and the web browser can be part of a single client-server interface; for example, the application 112 can be implemented as a plugin to the web browser or to another framework or operating system. Any other suitable client software architecture, including but not limited to widget frameworks and applet technology, can also be employed.

Media content can be provided to the user device 110 by content server 102, which can be a web server, media server, a node in a content delivery network, or other content source. In some implementations, the application 112 (or a portion thereof) is provided by application server 106. For example, some or all of the described functionality of the application 112 can be implemented in software downloaded to or existing on the user device 110 and, in some instances, some or all of the functionality exists remotely. For example, certain video encoding and processing functions can be performed on one or more remote servers, such as application server 106. In some implementations, the user device 110 serves only to provide output and input functionality, with the remainder of the processes being performed remotely.

The user device 110, content server 102, application server 106, and/or other devices and servers can communicate with each other through communications network 114. The communication can take place via any media such as standard telephone lines, LAN or WAN links (e.g., T1, T3, 56 kb, X.25), broadband connections (ISDN, Frame Relay, ATM), wireless links (802.11, Bluetooth, GSM, CDMA, etc.), and so on. The network 114 can carry TCP/IP protocol communications and HTTP/HTTPS requests made by a web browser, and the connection between clients and servers can be communicated over such TCP/IP networks. The type of network is not a limitation, however, and any suitable network can be used.

More generally, the techniques described herein can be implemented in any suitable hardware or software. If implemented as software, the processes can execute on a system capable of running one or more custom operating systems or commercial operating systems such as the Microsoft Windows® operating systems, the Apple OS X® operating systems, the Apple iOS® platform, the Google Android™ platform, the Linux® operating system and other variants of UNIX® operating systems, and the like. The software can be implemented a computer including a processing unit, a system memory, and a system bus that couples various system components including the system memory to the processing unit.

The system can include a plurality of software modules stored in a memory and executed on one or more processors. The modules can be in the form of a suitable programming language, which is converted to machine language or object code to allow the processor or processors to read the instructions. The software can be in the form of a standalone application, implemented in any suitable programming language or framework.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

Media Presentations

The media presentations referred to herein can be structured in various forms. For example, a particular media presentation can be an online streaming video having multiple tracks or streams that a user can switch among in real-time or near real-time. For example, a media presentation can be structured using parallel audio and/or video tracks as described in U.S. patent application Ser. No. 14/534,626, filed on Nov. 6, 2014, and entitled "Systems and Methods for Parallel Track Transitions," the entirety of which is incorporated by reference herein. More specifically, a playing video file or stream can have one or more parallel tracks that can be switched among in real-time automatically and/or based on user interactions. In some implementations, such switches are made seamlessly and substantially instantaneously, such that the audio and/or video of the playing content can continue without any perceptible delays, gaps, or buffering. In further implementations, switches among tracks maintain temporal continuity; that is, the tracks can be synchronized to a common timeline so that there is continuity in audio and/or video content when switching from one track to another (e.g., the same song is played using different instruments on different audio tracks; same storyline performed by different characters on different video tracks, and the like).

Such media presentations can also include interactive video structured in a video tree, hierarchy, or other form. A video tree can be formed by nodes that are connected in a branching, hierarchical, or other linked form. Nodes can each have an associated video segment, audio segment, graphical user interface (GUI) elements, and/or other associated media. Users (e.g., viewers) can watch a video that begins from a starting node in the tree and proceeds along connected nodes in a branch or path. Upon reaching a point during playback of the video where multiple video segments (child nodes) branch off from a segment (parent node), the user can interactively select the branch or path to traverse and, thus, the next video segment to watch.

As referred to herein, a particular branch or path in an interactive media structure, such as a video tree, can refer to a set of consecutively linked nodes between a starting node and ending node, inclusively, or can refer to some or all possible linked nodes that are connected subsequent to (e.g., sub-branches) or that include a particular node. Branched video can include seamlessly assembled and selectably presentable multimedia content such as that described in U.S. patent application Ser. No. 13/033,916, filed on Feb. 24, 2011, and entitled "System and Method for Seamless Multimedia Assembly" (the "Seamless Multimedia Assembly application"), and U.S. patent application Ser. No. 14/107,600, filed on Dec. 16, 2013, and entitled "Methods and Systems for Unfolding Video Pre-Roll," the entireties of which are hereby incorporated by reference.

The prerecorded video segments in a video tree or other structure can be selectably presentable multimedia content; that is, some or all of the video segments in the video tree can be individually or collectively played for a user based upon the user's selection of a particular video segment, an interaction with a previous or playing video segment, or other interaction that results in a particular video segment or segments being played. The video segments can include, for example, one or more predefined, separate multimedia content segments that can be combined in various manners to create a continuous, seamless presentation such that there are no noticeable gaps, jumps, freezes, delays, or other visual or audible interruptions to video or audio playback between segments. In addition to the foregoing, "seamless" can refer to a continuous playback of content that gives the user the appearance of watching a single, linear multimedia presentation, as well as a continuous playback of multiple content segments that have smooth audio and/or video transitions (e.g., fadeout/fade-in, linking segments) between two or more of the segments.

In some instances, the user is permitted to make choices or otherwise interact in real-time at decision points or during decision periods interspersed throughout the multimedia content. Decision points and/or decision periods can occur at any time and in any number during a multimedia segment, including at or near the beginning and/or the end of the segment. Decision points and/or periods can be predefined, occurring at fixed points or during fixed periods in the multimedia content segments. Based at least in part on the user's choices made before or during playback of content, one or more subsequent multimedia segment(s) associated with the choices can be presented to the user. In some implementations, the subsequent segment is played immediately and automatically following the conclusion of the current segment, whereas in other implementations, the subsequent segment is played immediately upon the user's interaction with the video, without waiting for the end of the decision period or the end of the segment itself.

If a user does not make a selection at a decision point or during a decision period, a default, previously identified selection, or random selection can be made by the system. In some instances, the user is not provided with options; rather, the system automatically selects the segments that will be shown based on information that is associated with the user, other users, or other factors, such as the current date. For example, the system can automatically select subsequent segments based on the user's IP address, location, time zone, the weather in the user's location, social networking ID, saved selections, stored user profiles, preferred products or services, and so on. The system can also automatically select segments based on previous selections made by other users, such as the most popular suggestion or shared selections. The information can also be displayed to the user in the video, e.g., to show the user why an automatic selection is made. As one example, video segments can be automatically selected for presentation based on the geographical location of three different users: a user in Canada will see a twenty-second beer commercial segment followed by an interview segment with a Canadian citizen; a user in the US will see the same beer commercial segment followed by an interview segment with a US citizen; and a user in France is shown only the beer commercial segment.

Multimedia segment(s) selected automatically or by a user can be presented immediately following a currently playing segment, or can be shown after other segments are played. Further, the selected multimedia segment(s) can be presented to the user immediately after selection, after a fixed or random delay, at the end of a decision period, and/or at the end of the currently playing segment. Two or more combined segments can form a seamless multimedia content path or branch, and users can take multiple paths over multiple playthroughs, and experience different complete, start-to-finish, seamless presentations. Further, one or more multimedia segments can be shared among intertwining paths while still ensuring a seamless transition from a previous segment and to the next segment. The content paths can be predefined, with fixed sets of possible transitions in order to ensure seamless transitions among segments. The content paths can also be partially or wholly undefined, such that, in some or all instances, the user can switch to any known video segment without limitation. There can be any number of predefined paths, each having any number of predefined multimedia segments. Some or all of the segments can have the same or different playback lengths, including segments branching from a single source segment.

Traversal of the nodes along a content path in a tree can be performed by selecting among options that appear on and/or around the video while the video is playing. In some implementations, these options are presented to users at a decision point and/or during a decision period in a content segment. Some or all of the displayed options can hover and then disappear when the decision period ends or when an option has been selected. Further, a timer, countdown or other visual, aural, or other sensory indicator can be presented during playback of content segment to inform the user of the point by which 7 should (or, in some cases, must) make his selection. For example, the countdown can indicate when the decision period will end, which can be at a different time than when the currently playing segment will end. If a decision period ends before the end of a particular segment, the remaining portion of the segment can serve as a non-interactive seamless transition to one or more other segments. Further, during this non-interactive end portion, the next multimedia content segment (and other potential next segments) can be downloaded and buffered in the background for later playback (or potential playback).

A segment that is played after (immediately after or otherwise) a currently playing segment can be determined based on an option selected or other interaction with the video. Each available option can result in a different video and audio segment being played. As previously mentioned, the transition to the next segment can occur immediately upon selection, at the end of the current segment, or at some other predefined or random point. Notably, the transition between content segments can be seamless. In other words, the audio and video continue playing regardless of whether a segment selection is made, and no noticeable gaps appear in audio or video playback between any connecting segments. In some instances, the video continues on to another segment after a certain amount of time if none is chosen, or can continue playing in a loop.

In one example, the multimedia content is a music video in which the user selects options upon reaching segment decision points to determine subsequent content to be played. First, a video introduction segment is played for the user. Prior to the end of the segment, a decision point is reached at which the user can select the next segment to be played from a listing of choices. In this case, the user is presented with a choice as to who will sing the first verse of the song: a tall, female performer, or a short, male performer. The user is given an amount of time to make a selection (i.e., a decision period), after which, if no selection is made, a default segment will be automatically selected. The default can be a predefined or random selection. Of note, the media content continues to play during the time the user is presented with the choices. Once a choice is selected (or the decision period ends), a seamless transition occurs to the next segment, meaning that the audio and video continue on to the next segment as if there were no break between the two segments and the user cannot visually or audibly detect the transition. As the music video continues, the user is presented with other choices at other decisions points, depending on which path of choices is followed. Ultimately, the user arrives at a final segment, having traversed a complete multimedia content path.

Interactive Videos for Physical Items

In various embodiments, interactive videos may feature one or more physical items, e.g., for the purpose of selling the item, for educating a user about the item, for training a user about the item, etc. Example embodiments of the interactive videos may enable a user to interact with a representation of an item. In some embodiments, the interactive video may be configured such that the user is able to interact with the representation of the item within the video, outside of the video, adjacent to the video, etc.

For example, in the context of a product on sale (e.g., a car, a shirt, gym equipment, etc.), the video featuring the product may be configured to enable a user to interact with the representation of the product, the product's features, types of the product, options for the product, accessories for the product, other products similar and/or related to the product, etc. In this way, the user can explore and learn more about the product before making a purchasing decision. In another example, in the context of an educational video featuring a subject item, the video may be configured to present a representation of the subject item (e.g., a whale, a circuit, a plant, a book, etc.). The user (e.g., student, trainee, etc.) can interact with the subject item to learn more about and/or investigate the features of the subject item, reconfigurability of the item, etc. It is understood that, while this disclosure features systems and methods for generating interactive videos for products, the example systems and methods described herein can be applied to interactive videos featuring educational items, training items, items subject to investigation, items subject to analysis, etc.

In various embodiments, the interactive video can be included (integrated, embedded, etc.) in a website, an app for a mobile device, on an automated platform, etc. For example, the interactive video featuring a product may be on the product-specific webpage or a product detail page (PDP) of the app or platform. In another example, the interactive video can be part of a retail website (e.g., Nike.com, Toyota.com, Samsung.com, etc.) or a part of an online marketplace (e.g., Walmart.com, Amazon.com, etc.).

Automated Platform and Related Methods

Figure 2:
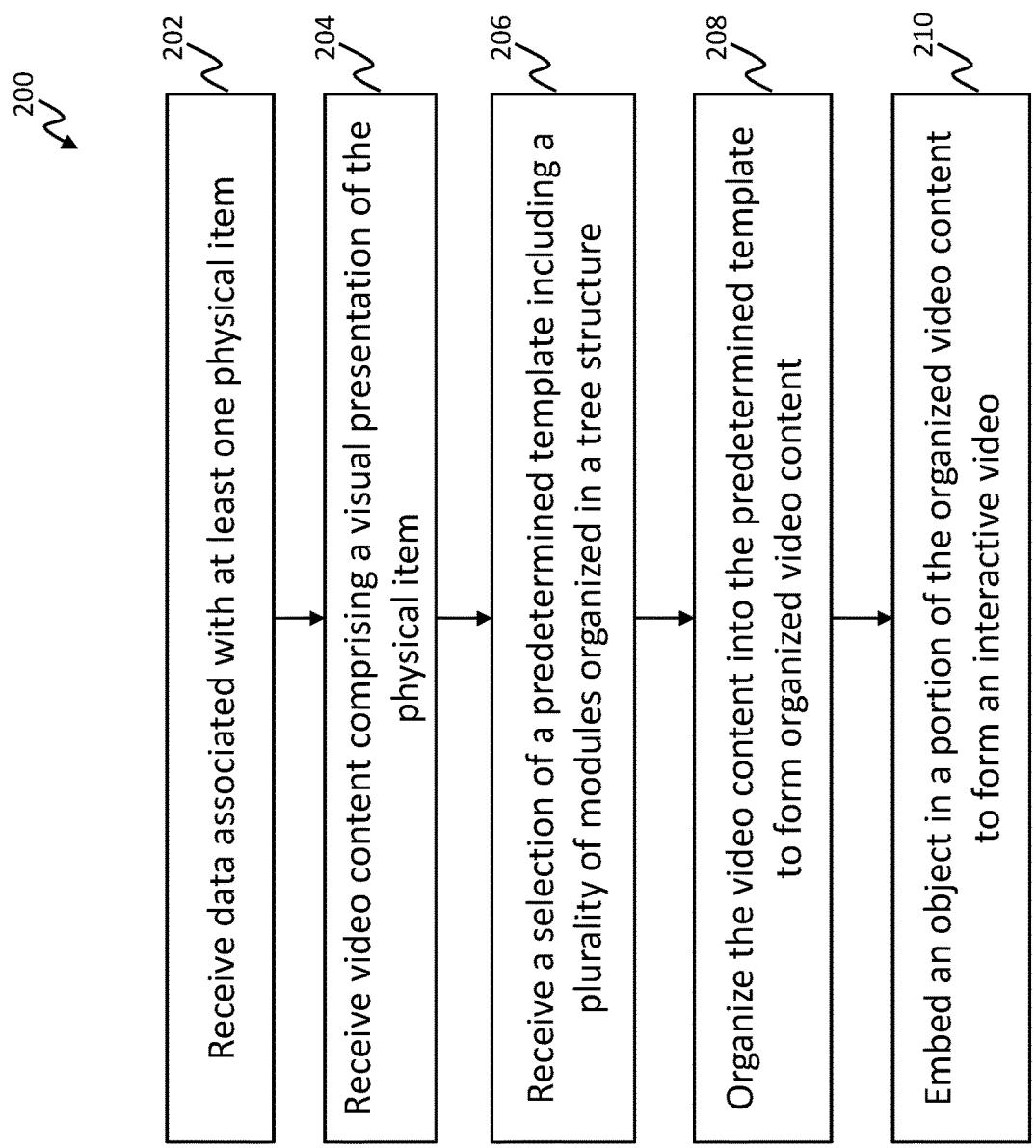
FIG. 2 is a flowchart of an example method for generating an interactive video on an automated platform.
Figure 3:
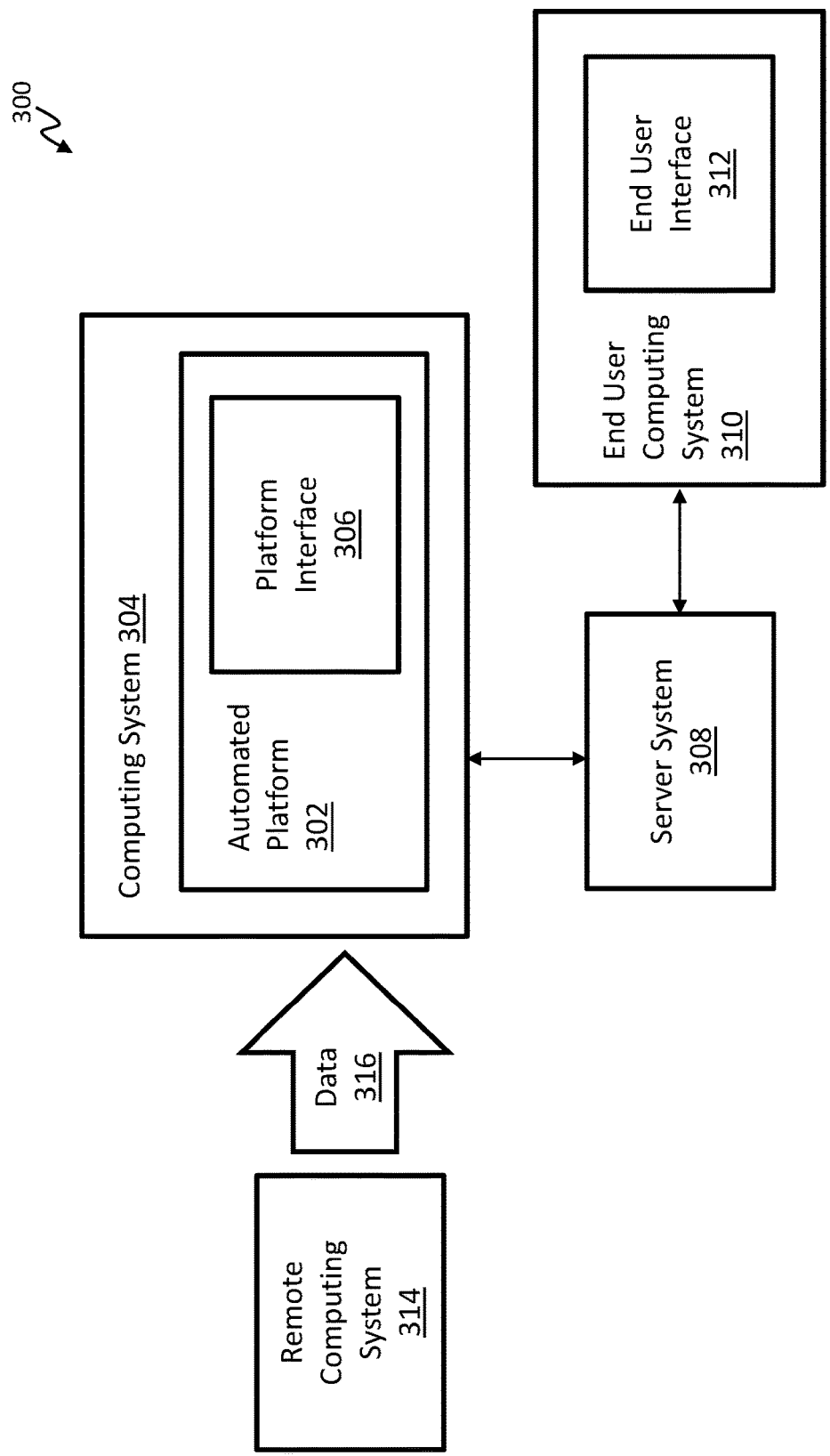
FIG. 3 is a diagram of an example system including the automated platform.

In various embodiments, an automated platform can be configured to generate an interactive video. FIG. 2 shows a flowchart of an example method for generating an interactive video on an automated platform. FIG. 3 illustrates a diagram of an example system including the automated platform. For the sake of clarity and conciseness, FIGS. 2-3 are discussed together herein. The term "publisher" is used to refer to the user that is involved in generating the interactive videos and the term "end user" is used to refer to the user that interacts with the interactive videos.

Referring to FIG. 3, the example system 300 may include an automated platform 302 hosted on a computing system 304. In some embodiments, the automated platform 302 includes a platform interface 306. A server system 308 may be configured to be connected (e.g., via an API, via the cloud, a computer network, etc.) to the computing system 304. The server system 308 may be configured to be connected (e.g., via an API, via the cloud, a computer network, etc.) to an end user computing system 310. The end user computing system 310 may have an end user interface 312. The end user computing system 310 may be a mobile device, a smartphone, a tablet computer, a laptop computer, a notebook computer, a set of smart glasses, a smart watch, a headset, etc. Note that the system 300 may be communicably connected (e.g., via an API, via the cloud, a computer network, etc.) to other computing systems, e.g., remote computing system 314.

In step 202, the system 300 (e.g., automated platform 302) can be configured to receive data 316 associated with at least one physical item. The received data 316 may be streamed, received via an application programming interface (API), received in one or more data files, and/or received in a bulk data transfer. The received data 316 to may be inputted by the publisher and/or obtained from a remote computing system 314. For example, the data 316 may include an identification number or code associated the item (e.g., a stock keeping unit (SKU), an ID number, etc.), a link to a website (e.g., a URL) associated with the item, a text description associated with the item, one or more tags associated with the item, a list of features associated with the item, one or more images of the item, one or more videos associated with the item, one or more videos associated with the item feature, one or more audio data associated with the item, and/or one or more audio data associated with the item features. For example, the received data 316 for a particular product may include a product name, one or more pictures of the product, customer reviews of the product, a product description, inventory status, one or more tags, an identification number, etc. As described further below, one or more of these data may be used or presented in or adjacent to the interactive video featuring the product item.

In step 204, the system 300 can be configured to receive video content including a visual presentation of one or more physical items. In some embodiments, the interactive video features one item. In some embodiments, the interactive video features two or more options (e.g., color, size, similar products, etc.) for the same item. In some embodiments, the interactive video features two or more items. For example, an interactive video can feature a cooking video with a grocery shopping list of ingredients used in the video. In another example, an interactive video for skiing or snowboarding can feature multiple pieces of clothing, equipment, accessories, etc. for purchase.

In step 206, the system 300 can be configured to receive a selection of a predetermined template. The predetermined template may include two or more modules (also referred to as "sections") organized in a tree structure. Note that the system 300 may store and/or reference one or more templates based on the item, a feature of the item, a tag associated with the item, the publisher's preference, etc. Different templates may be associated with different tree structures, may have different appearances, and/or accommodate different data (e.g., video, audio, etc.) associated with the item. The publisher can select an appropriate template for a given item; add, remove, or adjust modules; adjust the associated tree structure; add, remove, or adjust the data in the template.

Figures 4A, 4B:
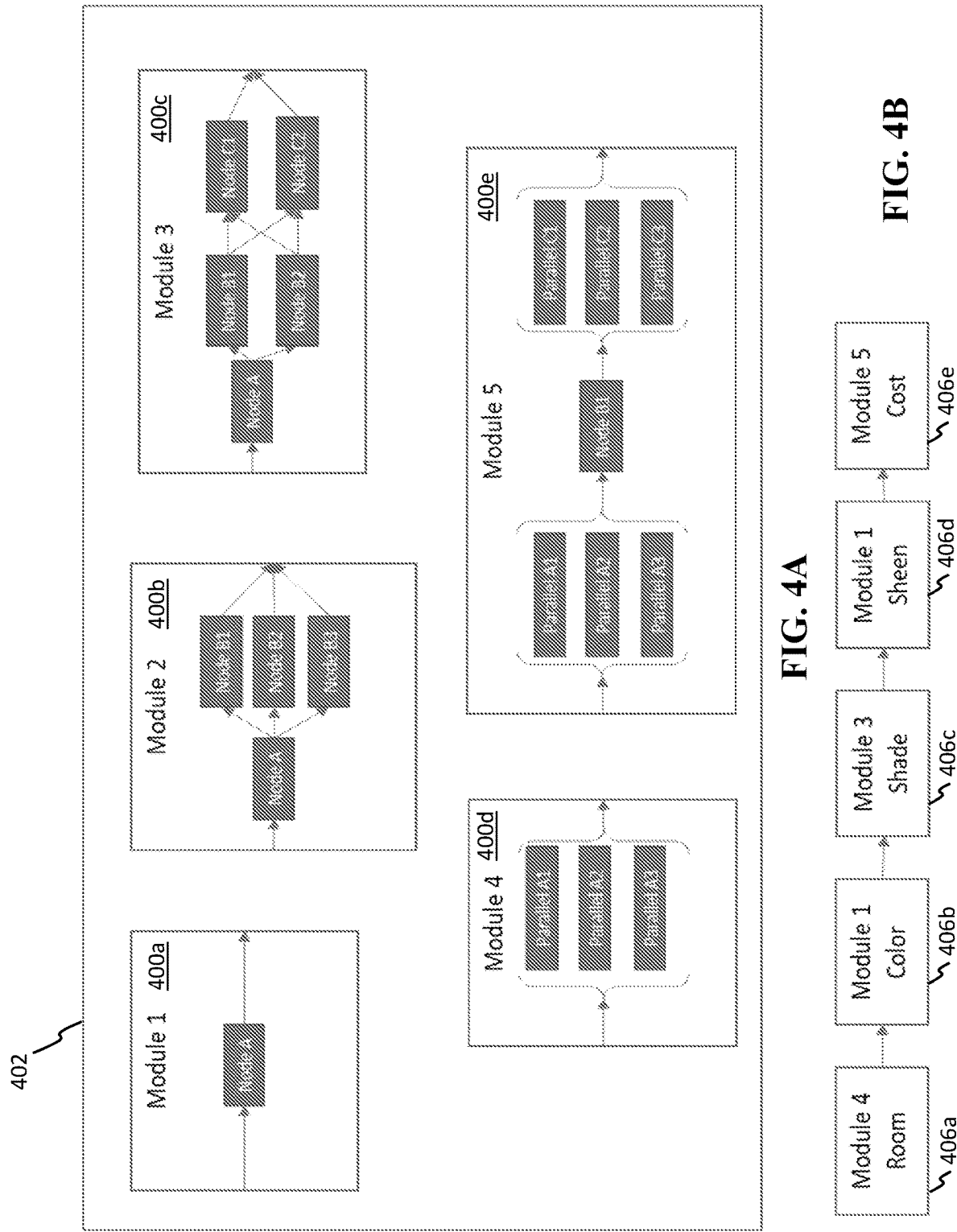
FIG. 4A is a diagram illustrating example module types for use in the example system of FIG. 3.
FIG. 4B is a diagram of an example project formed from five modules.

FIG. 4A illustrates example module types for use in system 300. A given module may include one or more nodes arranged in a tree structure. Illustrated are module type 1 (400a), module type 2 (module 400b), module type 3 (module 400c), module type 4 (module 400d), and module type 5 (module 400e) (collectively referred as module types 400). It is understood that other types and/or configurations of modules are within the scope of this disclosure. For instance, module type 1 may include a single node A having an input (connected to the input of the module 400a) and an output (connected to the output of the module 400a). Module type 2 may include node A having an input (connected to the input to the module 400b) and an output connected to the inputs of nodes B1, B2, and B3. Nodes B1, B2, and B3 can be arranged in parallel. The outputs of nodes B1, B2, and B3 can form the output of module 400b. Module type 3 may include a node A having an input (connected to the input of the module 400c) and an output connected to the inputs of node B1 and node B2 (which can be arranged in parallel to one another). The outputs of node B1 and node B2 can be connected to the inputs of node C1 and node C2. The outputs of node C1 and node C2 can be connected to the output of module 400c. Module type 4 may include parallel node A1, node A2, and node A3. The input of module 400d can be connected to one or more of the parallel nodes and the output of one or more of the parallel nodes can be connected to the output of the module 400d. Module type 5 can include parallel node A1, node A2, and node A3. The input of module 400e can be connected to one or more of the parallel nodes A1, A2, A3. The output of one or more of the parallel nodes can be connected to the input of node B1. The output of node B1 can be connected to one or more of the inputs of parallel nodes C1, C2, C3. The outputs of parallel nodes C1, C2, C3 can be connected to the output of module 400e. In various embodiments, one or more modules 400 of types 1-5 can be part of a project workspace 402. These modules 400 can be selected and/or organized by a user (e.g., a publisher) working in the project workspace 402.

FIG. 4B illustrates an example project 404 formed from five modules. In this example, the project 404 is for an interactive video enabling the selection of a wall paint. The project includes module 406a (of type 4) enabling the selection of a room (e.g., in a residence); module 406b (of type 1) enabling the selection of a color; module 406c (of type 3) enabling the selection of a shade; module 406d (of type 1) enabling the selection of a sheen; and module 406e (of type 5) enabling the selection of cost.

Figure 4C:
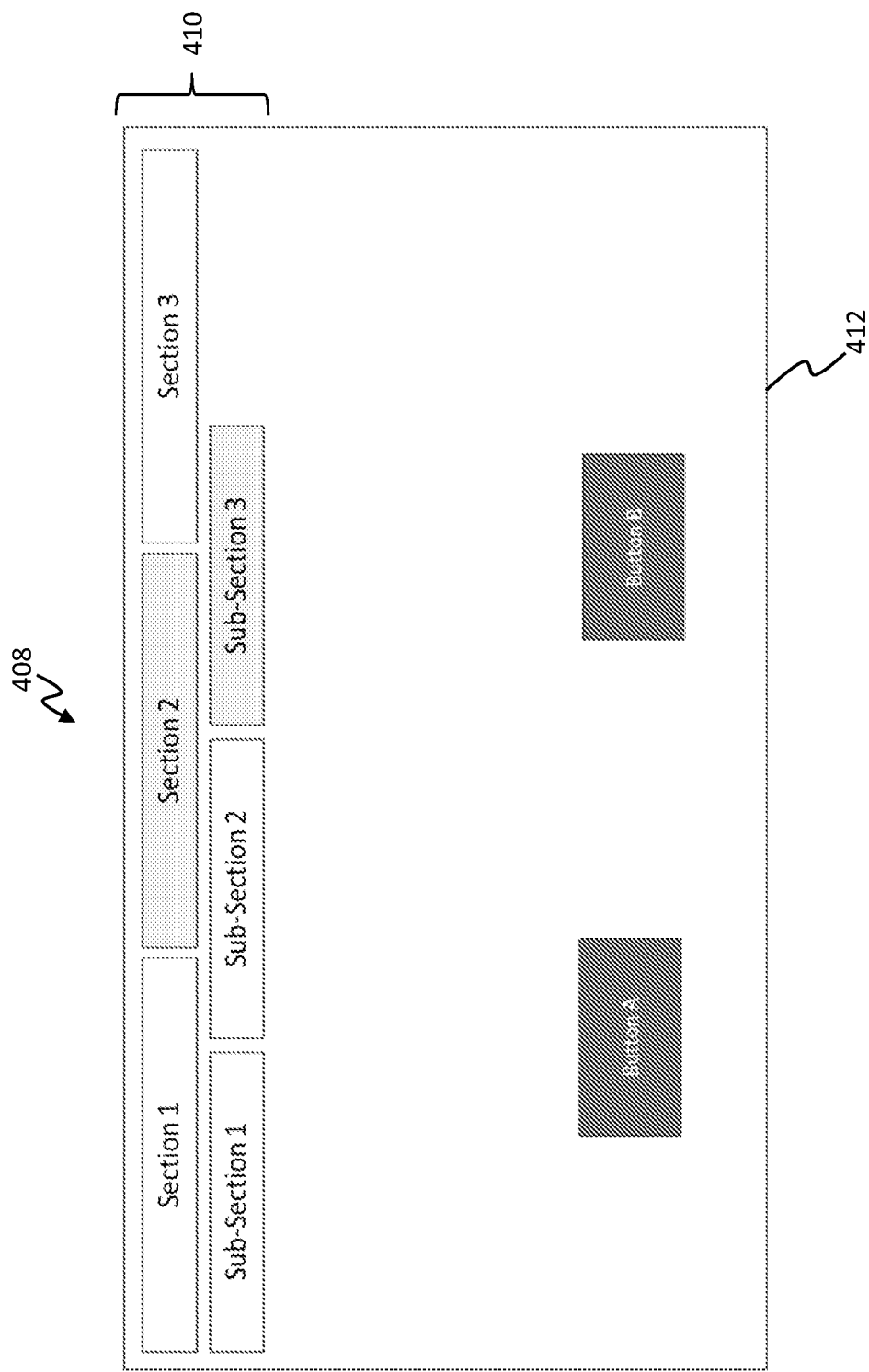
FIG. 4C is a diagram of an example template for an interactive video.

FIG. 4C illustrates an example template 408. As illustrated, the template 408 includes an index of sections at the top 410 of the frame 412. The interactive video may play inside the frame 412 as it is being configured for interactivity. The example template 408 may include two or more sections (e.g., Section 1, Section 2, Section 3), two or more sub-sections (e.g., Sub-Section 1, Sub-Section 2, Sub-Section 3), and two or more buttons (e.g., Button A, Button B). The sections and/or the subsections can each be associated with a particular interactive aspect of the video. The buttons can be configured by the publisher to enable a user select a feature or option in the interactive video.

In step 208, the system 300 can be configured to organize the video content into the predetermined template to form organized video template. In some embodiments, the video content may be received in portions and/or divided into portions after receipt. These video content portions may be organized into sections (and/or subsections). For example, a template for an interactive video featuring a toy may organize received video content such that the interactive video includes a first section for unboxing the toy, a second section for playing with the toy, and exploring the features of the toy. In another example, a template for an interactive video featuring a fashion product (e.g., clothes, accessories, shoes, etc.) may include a first section for the user to select a fashion influencer, a second section to view a product associated with the influencer, a third section to select a color, and a fourth section to select a color.

Figures 5A, 5B:
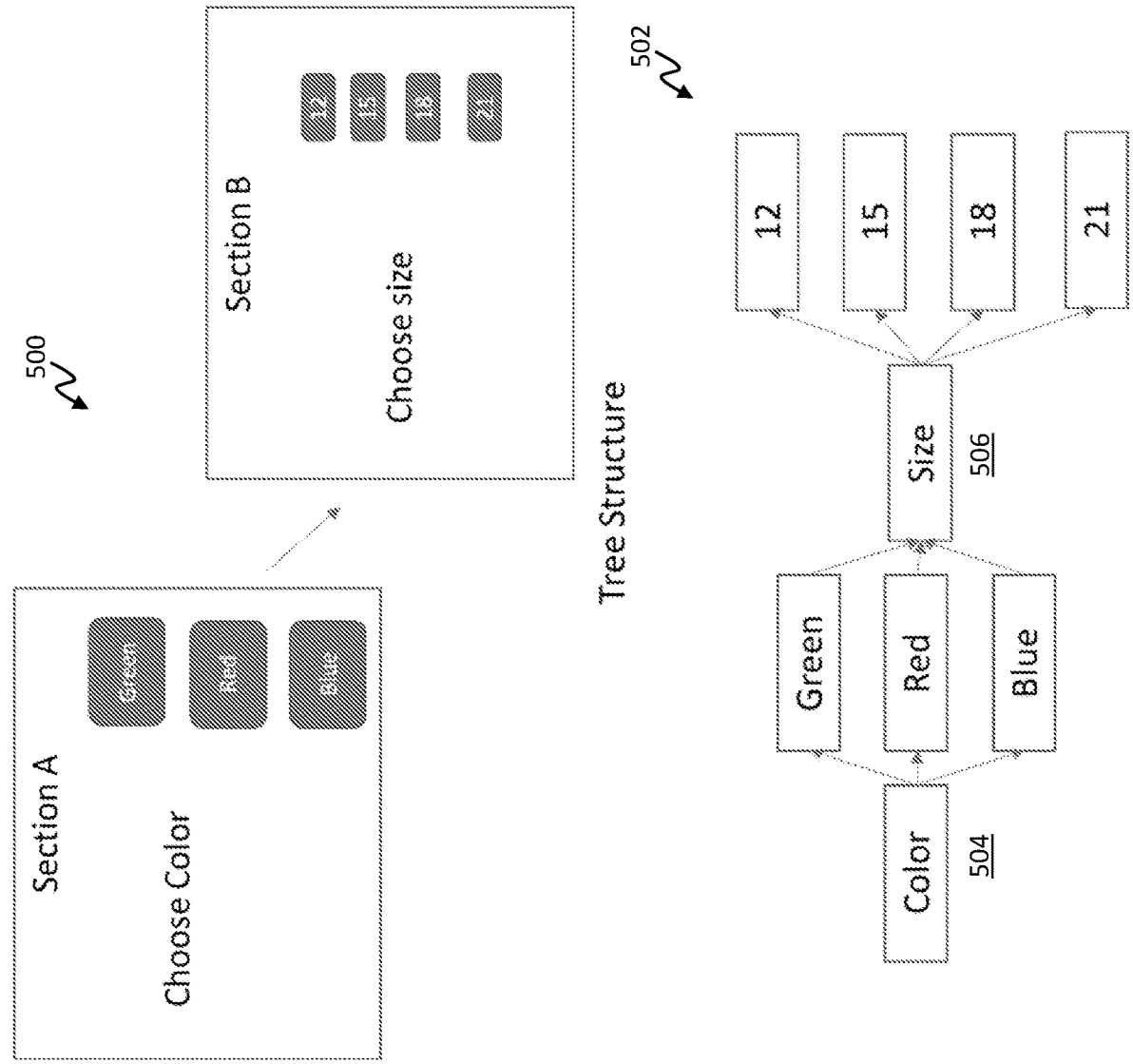
FIG. 5A is a diagram of an example template organized serially for selecting features of a particular product.
FIG. 5B is a diagram of a tree structure associated with the example template of FIG. 5A.

In step 210, an object (e.g., a button, an interactive element, a slide, etc.) may be embedded in a portion of the video content (e.g., in a section) to enable the end user to interact with the video. FIG. 5A illustrates example template 500 (or part of a template) organized serially (e.g., sequentially, in time, etc.) for selecting features of a particular product (e.g., item of clothing). The template 500 includes a first section (Section A) in which the end user is prompted to select a color of the product (e.g., green, red, or blue) and a second section (Section B) in which the end user is prompted to select a size of the product (e.g., 12, 15, 18, 21). As illustrated in FIG. 5B, the tree structure 502 is arranged such that the color branch 504 splits into three branches (one for each color green, red, blue). The color branches lead to the size branch 506, which splits into four branches (one for size 12, size 15, size 18, and size 21).

Figure 6A:
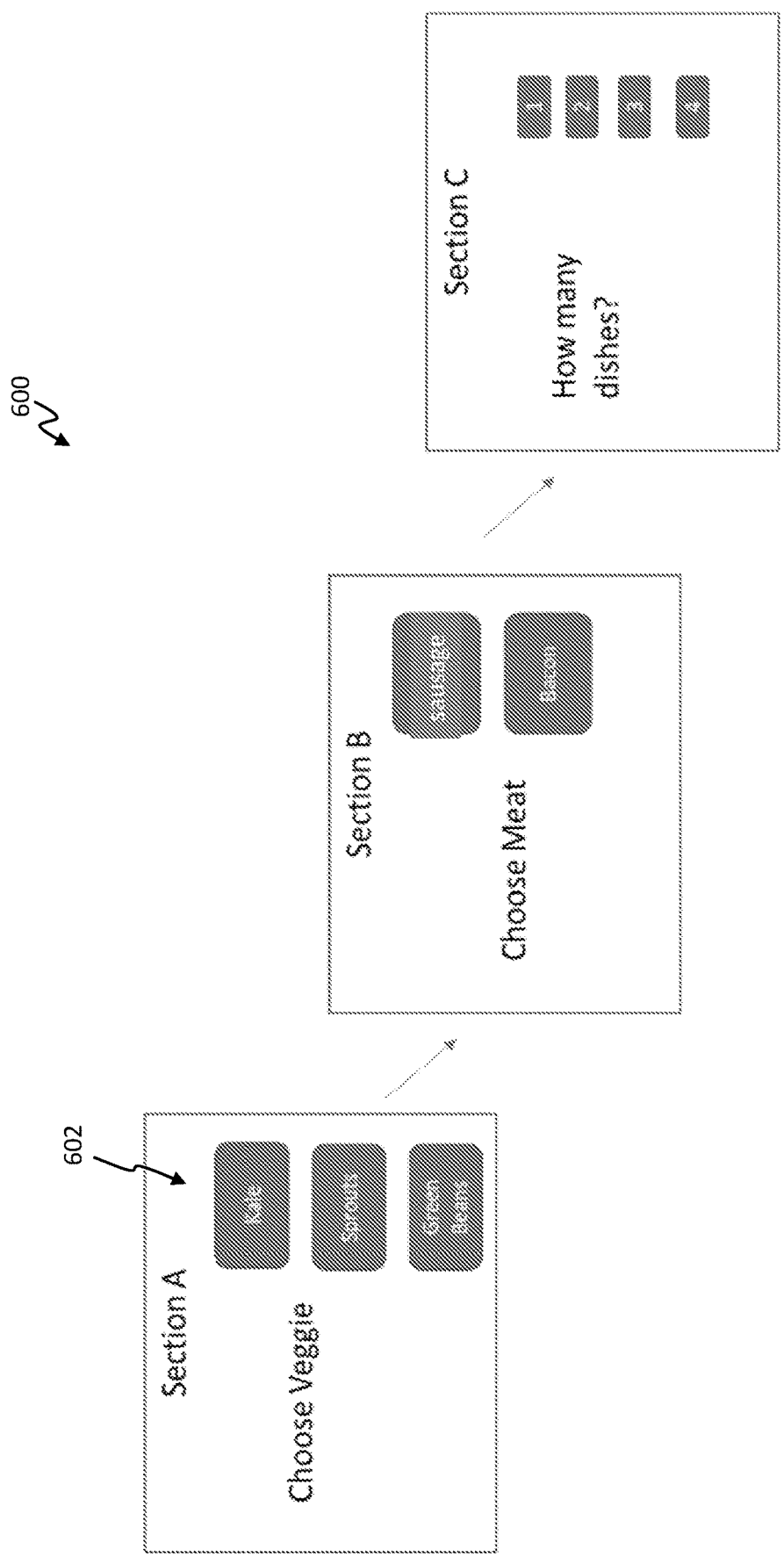
FIG. 6A is a diagram of an example template in which an interactive video enables multiple items to be selected.
Figure 6B:
FIG. 6B provides a shopping list that may be compiled based on the end user selections made in the interactive video of FIG. 6A.
Figure 6B:
Figure 6B:
Figure 6B:
Figure 6B:
Figure 6B:
Figure 6B:

FIG. 6A provides an example template 600 in which an interactive video enables multiple items to be selected. In this example, each section may include a video content portion associated with a food (e.g., a segment of a cooking video in which one or more ingredients are added). Therefore, in Section A, a video portion (e.g., associated with a vegetable component) may play and buttons (e.g., to types of vegetables respectively) may appear before, during, or after the video portion plays. Once a selection is made (e.g., button "Kale"), the interactive video moves to the next section having the next video content portion (e.g., associated with a meat component). Again, a selection of a button (e.g., sausage) is made and the video content in Section C is played. Note that this sequence may include more or less sections. The sections may be of different lengths. For example, FIG. 6B provides a shopping list that may be compiled based on the end user selections made in previous sections. It is understood that a similar list may be compiled based on an interactive video for winter sports equipment, a car with trim options, a product with various configurations, etc.

In some embodiments, the interactive video may be configured to wait for end user interaction (e.g., via a button) to move to the next section. In some embodiments, the interactive video may be configured to automatically select a button for the end user after some time period (or make no selection) and move to the next section.

Figure 7A:
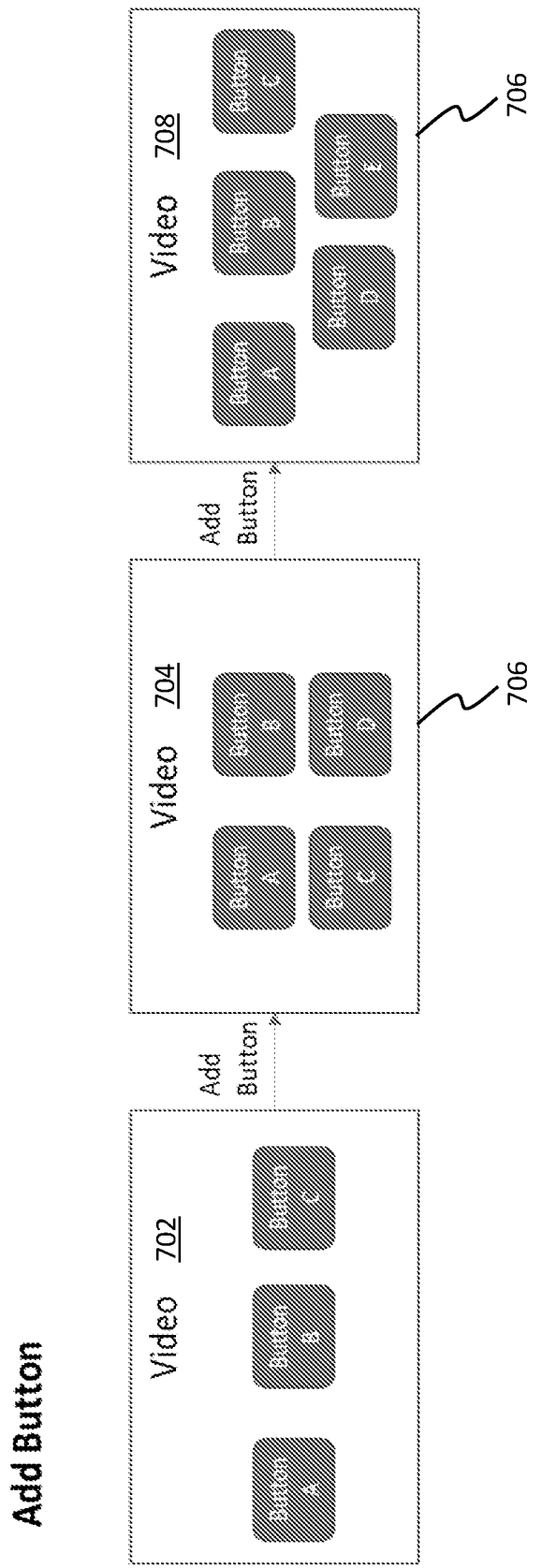
FIG. 7A is a diagram illustrating the adding of buttons into an example interactive video.

In some embodiments, the interactive video may be altered before, during, or after the video is "live" on a website. For example, one or more aspects of the template and/or the video content (e.g., buttons, sections, subsections, timeline, video content, data) may be adjusted. FIG. 7A illustrates the adding of buttons into an interactive video 702. In this example, interactive video 702 includes buttons A, B, and C. The publisher can add a button D to create 704. In some embodiments, the template is configured to enable the buttons A, B, C, and D to distribute automatically based on their number over the area inside the frame 706. Adding a button to video 704 causes the arrangement displayed in video 708, in which the five buttons are distributed in the frame 706. In some embodiments, this predetermined distribution of buttons is adjustable by the publisher. Note that the buttons described herein may be positioned anywhere within a frame (e.g., of the interactive video, of the player of the video, etc.), at the perimeter of the video, outside the video on the webpage.

Figure 7B:
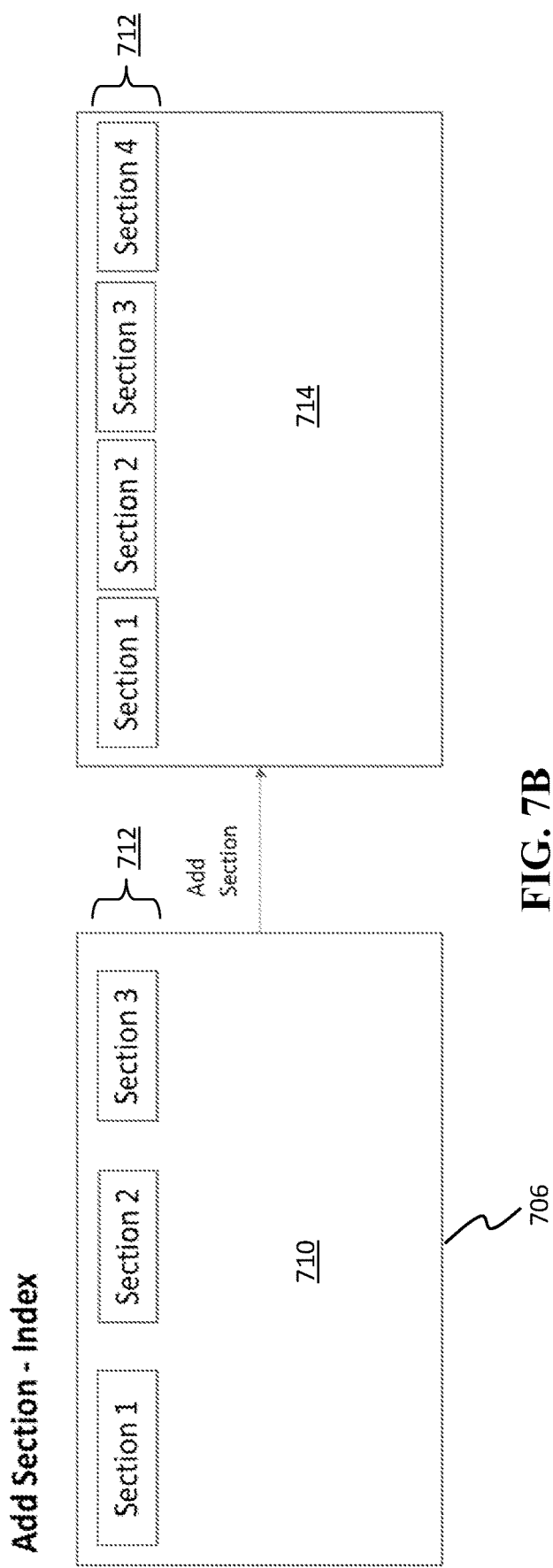
FIG. 7B is a diagram illustrating the adding of sections into an example interactive video.
Figure 7C:
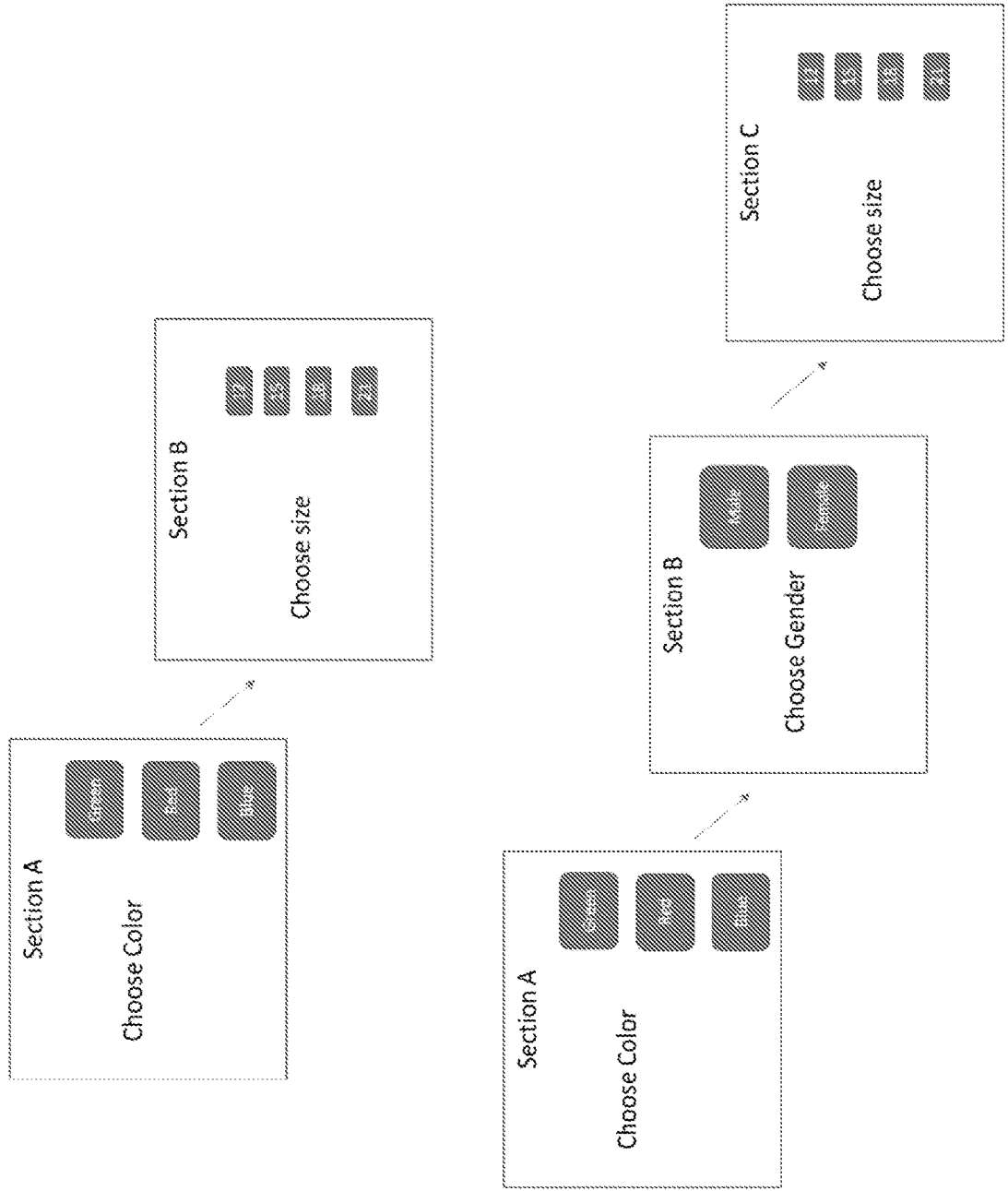
FIG. 7C is a diagram illustrating a section of video content added in a time-arranged sequence.

In FIG. 7B, the publisher can choose to add or subtract sections from an interactive video 710. In the illustrated example, the publisher has added a fourth section, which is added to the index at the top of the frame 712 to form interactive video 714. FIG. 7C illustrates an embodiment in which a section of video content is added in a time-arranged sequence. In particular, in interactive video 716, Section A (selecting a color of the item) passes to Section B (selecting a size of the item). The platform 302 enables the publisher to add a section between Sections A and B. For example, a new Section B (selecting a gender) is added between selecting a color in Section A and selecting a size in new Section C (old Section B). Note that the changes described herein to the interactive video has a corresponding effect in the tree structure for the interactive video.

In some embodiments, a template for an interactive video may be embedded into a website and may be configured to be "overridden" by data associated with the webpage. For instance, the template can include placeholder sections, buttons, fields, video content, images, number of template elements (e.g., sections, subsections, buttons, etc.), location of elements, etc. The template may then be overridden by the website in real time or near real time. The features of the template that can be overridden may be included in metadata associated with the template and/or webpage carrying the template. A publisher may choose to embed the template into multiple webpages (e.g., each webpage featuring a different model of a shoe, an online marketplace featuring a wide variety of products, etc.) and override the template with content and/or configurations specific to the item on that webpage. In some embodiments, the configuration of template, video content, and/or related data can be stored within data of the webpage.

Figures 8A, 8B:
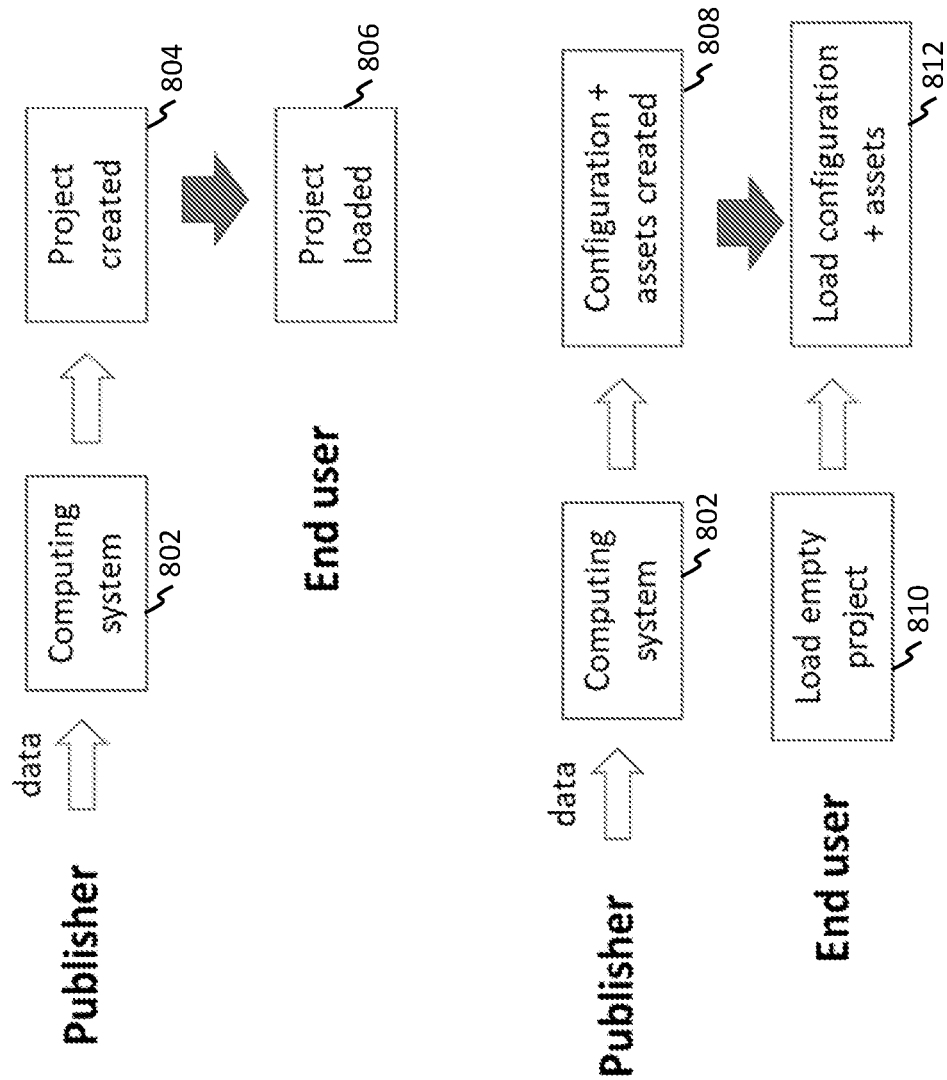
FIG. 8A is a high-level diagram illustrating the creation of a project without a template.
FIG. 8B is a high-level diagram illustrating the creation of a project with a template.

FIG. 8A illustrates, at a high level, the creation of a project without a template. In this case, the publisher inputs data into a computing system 802, which is configured to create the project 804. The end user then can load the created project 806 (e.g., onto a client device) and interact with the interactive video therein.

FIG. 8B illustrates, at a high level, the creation of a project with a template. In this case, the publisher inputs data into a computing system 802, which can create a configuration file. In the same step (or a separate step), assets (e.g., video file(s), audio file(s), metadata, etc.) can be added to the configuration file, creating a combined file 808. The end user can load an empty project 810 (e.g., on a client device) and the combined file 808 (or, alternatively, the configuration file and assets separately) can be loaded onto the empty project 810 to form the loaded project 812. In some cases, the loading of the empty project 810 and the loading of the combined filed 812 (or separate configuration file and assets) can be done in near-real time or real time.

Figure 8C:
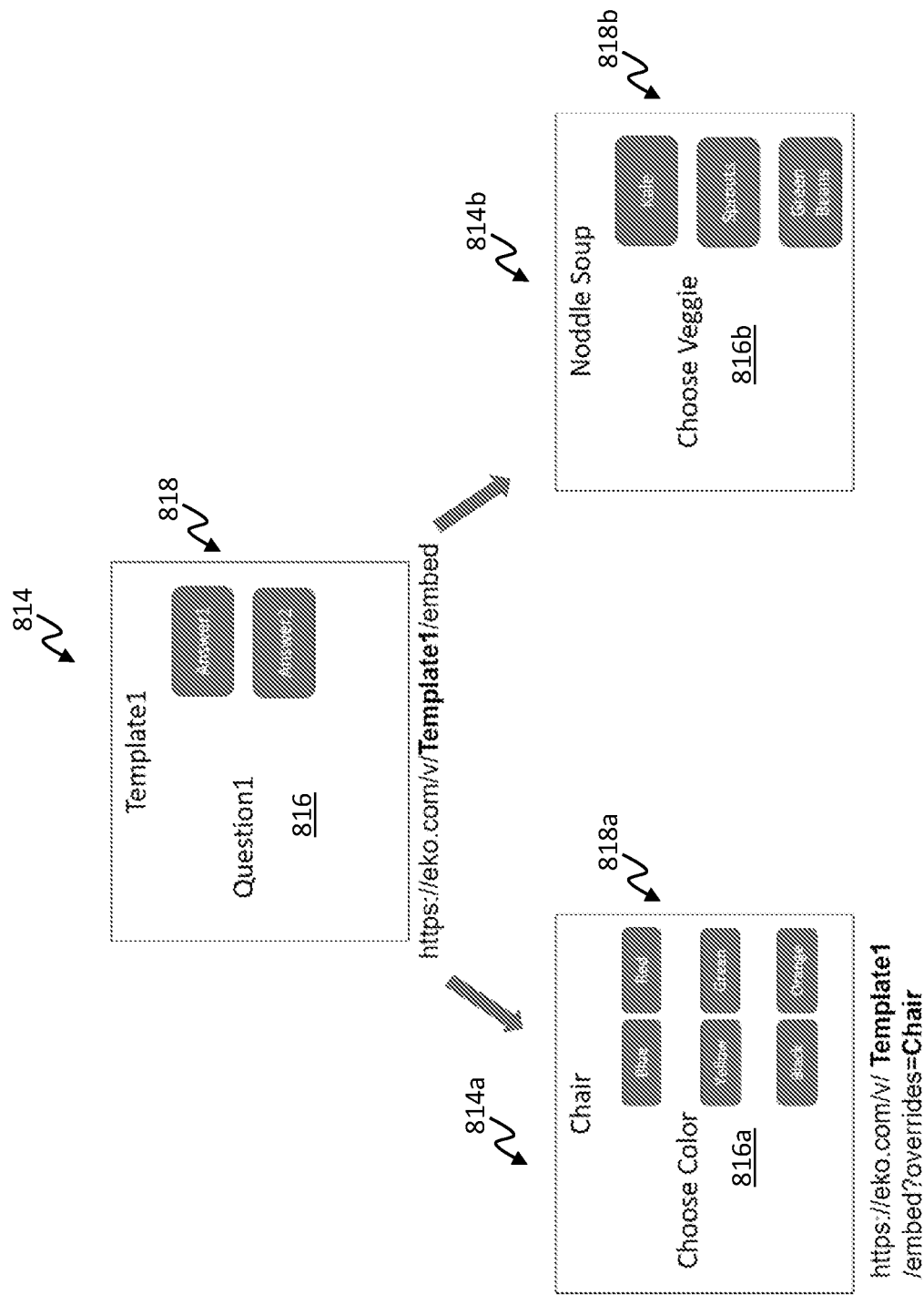
FIG. 8C is a diagram of an example template in which the metadata can override the video content and the button configuration.

FIG. 8C illustrates such a template 814 in which the metadata can override the video content 816 and the button configuration 818. For example, the template is embedded in website with a link: http://ek.com/v/Template1/embed. For a webpage featuring a chair 814a, the video content 816 may be overridden with video content 816a asking for user input on color. Accordingly, button configuration 818 may change to button configuration 818a to display various colors associate with the chair item. Additionally, the website link may change to: https://eko.com/v/Template1/embed?overides=Chair. Alternatively, the video content 816 may be overridden with video content 816b (e.g., for noodle soup) and button configuration 818 may be overridden with buttons 818b.

In some embodiments, each configuration of the template has an associated identification number. For example, in the above, the configuration of the template 814a for the chair interactive video has a different identification number than the configuration of the template 814b for the noodle soup interactive video. In some embodiments, the publisher is able to preview the interactive project in sandbox mode to determine any additional configuration or data needed for the websites.

In some embodiments, the platform 302 can include an automatic testing function and/or program (referred to as a tester) that is configured to determine whether a particular implementation of an interactive video is correct. For example, the tester can be configured to determine whether each section (e.g., node) has video content, whether each button is operational (e.g., responsive to user input), whether links to other websites are operational, whether the video content is in the intended size and/or format, whether analytics are being sent from the webpage, whether the API to the platform is valid, etc. If there are any issues as a result of testing, a substitute interactive video, a static video, or a static image may be placed temporarily while the issue is resolved (e.g., by the publisher).

End User Interaction and Related Analytics

In various embodiments, the end user of the platform 302 may be assigned a user identification number (referred to as "user_id"). The platform 302 may be configured to manage purchases and/or other transactions using this user_id. The end user may interact with the interactive video on website (e.g., of a merchant, organization, school, etc.) or on the platform 302.

Figures 9A, 9B:
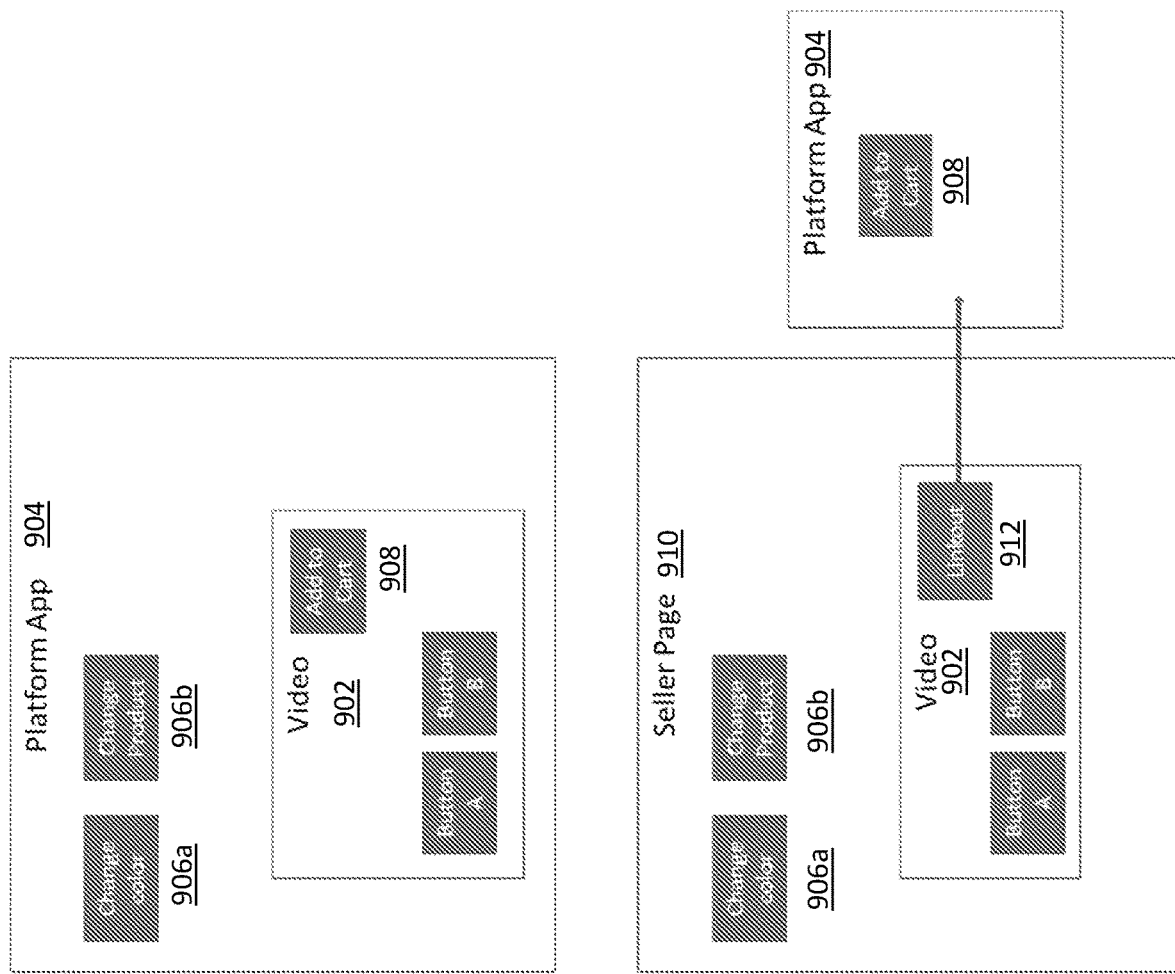
FIG. 9A is a diagram of an example interactive video configured on the platform app.
FIG. 9B is a diagram of the example interactive video of FIG. 9A configured on a seller's webpage.

FIG. 9A illustrates an example interactive video 902 as it is configured on the platform app 904. The platform app 904 includes data associated with sections 906a (e.g., change of color) and 906b (e.g., change of product). The interactive video 902 may be presented in platform interface 306 and can include buttons A, B. The video 902 may also include an option for the end user to add the product that is the subject of the video to shopping cart 908.

FIG. 9B illustrates the example interactive video 902 as it is configured on a seller's webpage 910. In this example, the interactive video 902 may include a link 912 to the shopping cart 908 hosted by the platform app 904. In other examples, the cart may be directly hosted by the seller's webpage 910.

In some embodiments, the platform 302 is configured to execute one or more analytical programs (referred to as analytics) on the interactive video, webpage, and/or app page to monitor and/or collect data on user interactions (e.g., selections, purchases, etc.). For example, this data can be used for marketing, product optimization, inventory optimization, etc. The data can be used by the merchant to determine which products are selected more than others, interacted with more frequently and/or for longer amounts of time, and/or purchased more often. In some cases, the data can be used to determine configurations for existing and/or future interactive videos. The analytics may keep track of user interactions via the user_id, the session associated with the playing of the video via the session identification number (referred to as session_id), the item identification number (referred to as the item_id), the URL, etc.

Figure 10A:
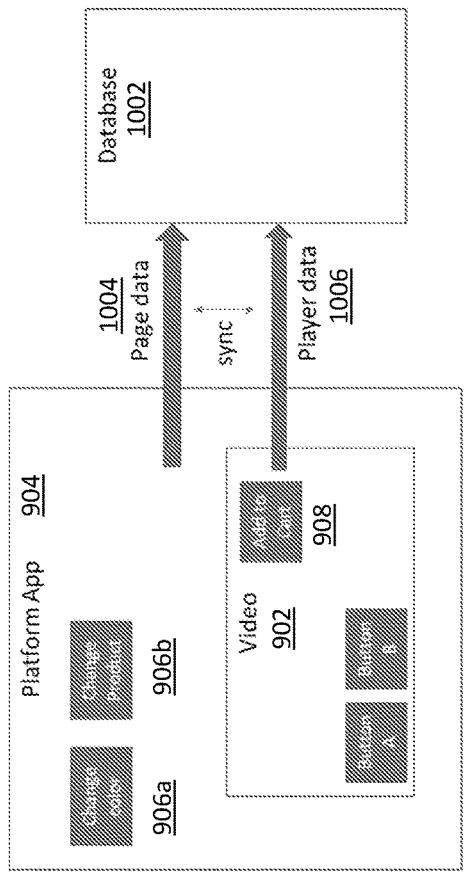
FIG. 10A is a diagram of an example interactive video configured on the platform app, in which a database is configured to collect data.

FIG. 10A illustrates the example interactive video 902 hosted by the platform app 904, as discussed above. In this example, a database 1002 is communicably connected to the platform app 904. The database 1002 may be hosted on the computing system 304 and/or a remote computing system. The page data 1004 and/or the player data 1006 (of the interactive video) may be sent to database 1002. In some embodiments, the page data 1004 and the player data 1006 may be synchronized, e.g., for the same session_id.

Figure 10B:
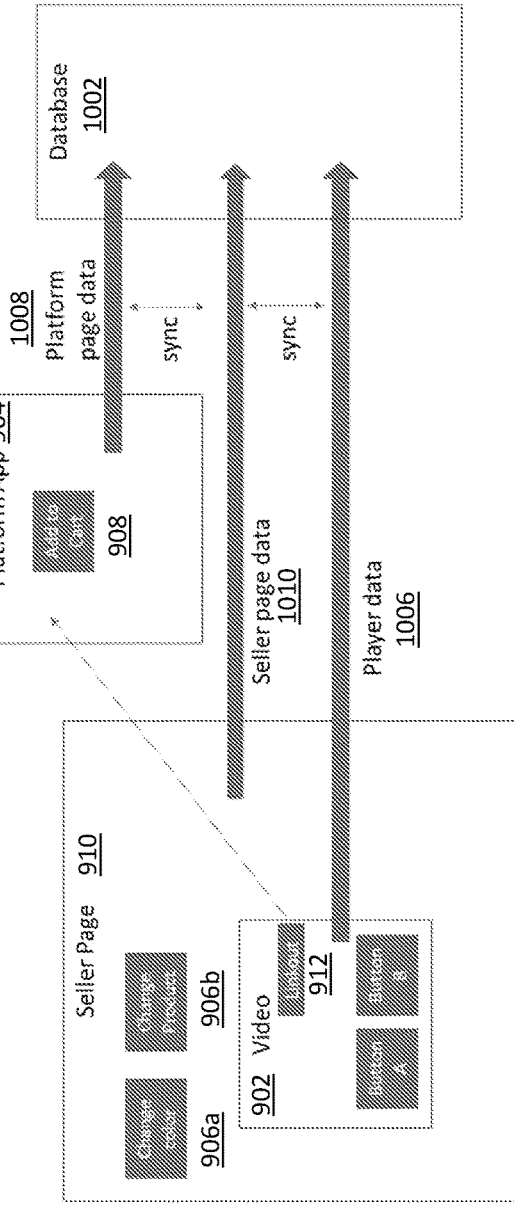
FIG. 10B is a diagram of the example interactive video of FIG. 9A configured on a seller's webpage, in which a database is configured to collect data.

FIG. 10B illustrates the example interactive vide 902 as configured on a seller's webpage 910. In this example, the database is communicably connected to the seller's page 910, the player, and/or the platform app 904. The page data 1008, the player data 1006, and/or platform page data 1008 may be transmitted to database 1002.

Terminology

While this specification contains many specific implementation details, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other steps or stages may be provided, or steps or stages may be eliminated, from the described processes. Accordingly, other implementations are within the scope of the following claims.

The phraseology and terminology used herein is for the purpose of description and should not be regarded as limiting.

The term "approximately", the phrase "approximately equal to", and other similar phrases, as used in the specification and the claims (e.g., "X has a value of approximately Y" or "X is approximately equal to Y"), should be understood to mean that one value (X) is within a predetermined range of another value (Y). The predetermined range may be plus or minus 20%, 10%, 5%, 3%, 1%, 0.1%, or less than 0.1%, unless otherwise indicated.

The indefinite articles "a" and "an," as used in the specification and in the claims, unless clearly indicated to the contrary, should be understood to mean "at least one." The phrase "and/or," as used in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

The use of "including," "comprising," "having," "containing," "involving," and variations thereof, is meant to encompass the items listed thereafter and additional items.

Use of ordinal terms such as "first," "second," "third," etc., in the claims to modify a claim element does not by itself connote any priority, precedence, or order of one claim element over another or the temporal order in which acts of a method are performed. Ordinal terms are used merely as labels to distinguish one claim element having a certain name from another element having a same name (but for use of the ordinal term), to distinguish the claim elements.

What is claimed is:

1. A method for generating interactive videos on an automated platform, the method comprising:
    receiving data associated with a plurality of products;
    receiving video content comprising visual presentations of the plurality of products;
    receiving a selection of a predetermined template based on the plurality of products, the template comprising a plurality of video modules organized in a video tree structure configured to accommodate the data associated with the plurality of products and the visual presentations of the plurality of products, wherein each video module of the plurality of video modules includes at least one node of the video tree structure and at least one video module of the plurality of video modules includes an arrangement of two or more nodes;
    organizing the received video content into the predetermined template to form organized video content, wherein organizing the received video content includes assigning a portion of the received video content to each node included in each video module of the plurality of video modules; and
    embedding at least one interactive object in the video content assigned to at least one node of at least one video module of the plurality of video modules, wherein the at least one interactive object is based on the received data and is configured to enable at least one of:
        (i) a user interaction with at least one product of the plurality of products; or
        (ii) a link to a webpage associated with at least one product of the plurality of products.

2. The method of claim 1, wherein each video module of the plurality of video modules is configured to represent a different product of the plurality of products.

3. The method of claim 1, wherein at least one video module of the plurality of video modules is configured to represent two or more different products of the plurality of products.

4. The method of claim 1, wherein at least one video module of the plurality of video modules represents a product category that is associated with two or more different products of the plurality of products.

5. The method of claim 1, wherein each user interaction corresponds to at least one of:
(a) a selection of at least one product for purchase;
(b) a selection of a quantity of the at least one product; or
(c) a selection of an attribute of the at least one product.

6. The method of claim 1, further comprising:
generating a user shopping list based on the user interactions, wherein the user shopping list includes at least a portion of the plurality of products.

7. The method of claim 1, further comprising:
generating a comparable product list based on the user interactions, wherein the comparable product list includes two or more products from the plurality of products that have comparable product characteristics.

8. The method of claim 1, wherein the received data is received via an application program interface (API).

9. The method of claim 1, wherein the received data comprises at least one of:
(a) an image of at least one product of the plurality of products;
(b) a review of at least one product of the plurality of products;
(c) a text description of at least one product of the plurality of products;
(d) an inventory status of at least one product of the plurality of products; or
(e) at least one tag associated with at least one product of the plurality of products.

10. The method of claim 1, wherein the received data is inputted by a user of the platform, and wherein the received data comprises at least one of:
(i) an identification number associated with at least one product of the plurality of products;
(ii) a webpage link associated with at least one product of the plurality of products;
(iii) a text description of at least one product of the plurality of products;
(iv) at least one tag associated with at least one product of the plurality of products; or
(v) at least one feature of at least one product of the plurality of products and, for each feature, a respective interaction type.

11. The method of claim 1, wherein the webpage is configured to enable purchase of at least one product of the plurality of products.

12. The method of claim 1, wherein the webpage is configured to present information associated with at least one product of the plurality of products.

13. The method of claim 1, further comprising receiving a modification of the predetermined template, the modification being at least one of:
(a) an addition of one or more video modules to the video tree structure; or
(b) a modification of a connection between two video modules of the video tree structure.

14. The method of claim 1, further comprising:
transmitting the interactive video to a website or an application for presentation.

15. A system for generating interactive videos on an automated platform, the automated system comprising:
at least one memory for storing computer-executable instructions; and
at least one processor for executing the instructions stored on the memory, wherein execution of the instructions programs the at least one processor to perform operations comprising:
receiving data associated with a plurality of products;
receiving video content comprising visual presentations of the plurality of products;
receiving a selection of a predetermined template based on the plurality of products, the template comprising a plurality of video modules organized in a video tree structure configured to accommodate the data associated with the plurality of products and the visual presentations of the plurality of products, wherein each video module of the plurality of video modules includes at least one node of the video tree structure and at least one video module of the plurality of video modules includes an arrangement of two or more nodes;
organizing the received video content into the predetermined template to form organized video content, wherein organizing the received video content includes assigning a portion of the received video content to each node included in each video module of the plurality of video modules; and
embedding at least one interactive object in the video content assigned to at least one node of at least one video module of the plurality of video modules, wherein the at least one interactive object is based on the received data and is configured to enable at least one of:
(i) a user interaction with at least one product of the plurality of products; or
(ii) a link to a webpage associated with at least one product of the plurality of products.

16. The system of claim 15, wherein each video module of the plurality of video modules is configured to represent a different product of the plurality of products.

17. The system of claim 15, wherein at least one video module of the plurality of video modules is configured to represent two or more different products of the plurality of products.

18. The system of claim 15, wherein at least one video module of the plurality of video modules represents a product category that is associated with two or more different products of the plurality of products.

19. The system of claim 15, wherein each user interaction corresponds to at least one of:
(a) a selection of at least one product for purchase;
(b) a selection of a quantity of the at least one product; or
(c) a selection of an attribute of the at least one product.

20. The system of claim 15, wherein the operations further comprise:
generating a user shopping list based on the user interactions, wherein the user shopping list includes at least a portion of the plurality of products.

21. The system of claim 15, wherein the operations further comprise:
generating a comparable product list based on the user interactions, wherein the comparable product list includes two or more products from the plurality of products that have comparable product characteristics.

22. The system of claim 15, wherein the received data is received via an application program interface (API).

23. The system of claim 15, wherein the received data comprises at least one of:
 (a) an image of at least one product of the plurality of products;
 (b) a review of at least one product of the plurality of products;
 (c) a text description of at least one product of the plurality of products;
 (d) an inventory status of at least one product of the plurality of products; or
 (e) at least one tag associated with at least one product of the plurality of products.

24. The system of claim 15, wherein the received data is inputted by a user of the platform, and wherein the received data comprises at least one of:
 (i) an identification number associated with at least one product of the plurality of products;
 (ii) a webpage link associated with at least one product of the plurality of products;
 (iii) a text description of at least one product of the plurality of products;
 (iv) at least one tag associated with at least one product of the plurality of products; or
 (v) at least one feature of at least one product of the plurality of products and, for each feature, a respective interaction type.

25. The system of claim 15, wherein the webpage is configured to enable purchase of at least one product of the plurality of products.

26. The system of claim 15, wherein the webpage is configured to present information associated with at least one product of the plurality of products.

27. The system of claim 15, wherein the operations further comprise receiving a modification of the predetermined template, the modification being at least one of:
 (a) an addition of one or more video modules to the video tree structure; or
 (b) a modification of a connection between two video modules of the video tree structure.

28. The system of claim 15, wherein the operations further comprise: transmitting the interactive video to a website or an application for presentation.

* * * * *